March 2, 1926.

F. N. REEVES 1,575,128

TESTING SYSTEM FOR TESTING SENDERS OF AUTOMATIC EXCHANGES

Filed Dec. 6, 1923

Inventor:
Frank N. Reeves.
by E. W. Adams
Att'y.

March 2, 1926.

F. N. REEVES 1,575,128

TESTING SYSTEM FOR TESTING SENDERS OF AUTOMATIC EXCHANGES

Filed Dec. 6, 1923   25 Sheets-Sheet 6

Inventor:
Frank N. Reeves.
by E. W. Adams
Att'y.

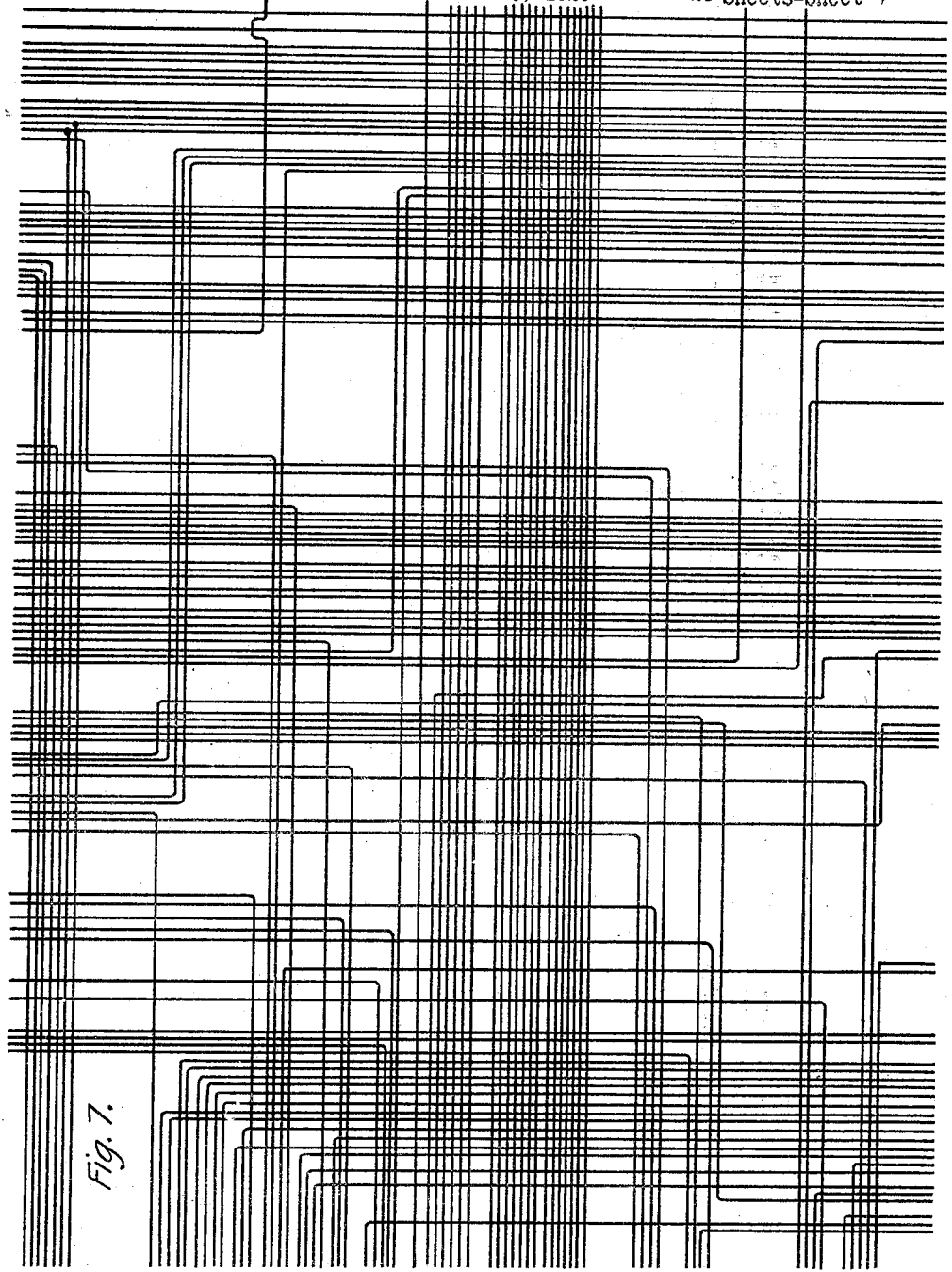

March 2, 1926.
F. N. REEVES
1,575,128
TESTING SYSTEM FOR TESTING SENDERS OF AUTOMATIC EXCHANGES
Filed Dec. 6, 1923     25 Sheets-Sheet 8
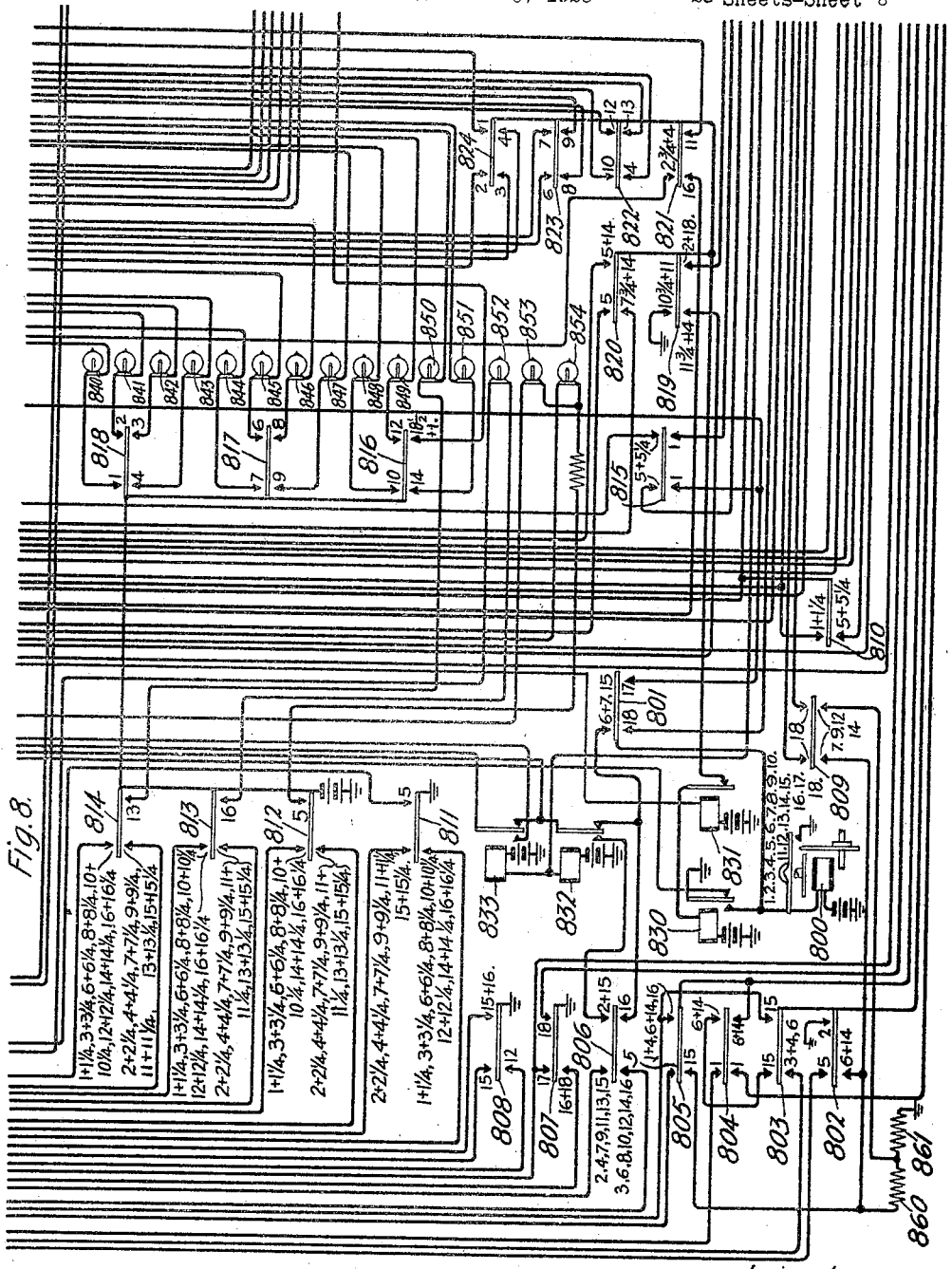
Inventor:
Frank N. Reeves.
by E. W. Adams
Att'y.

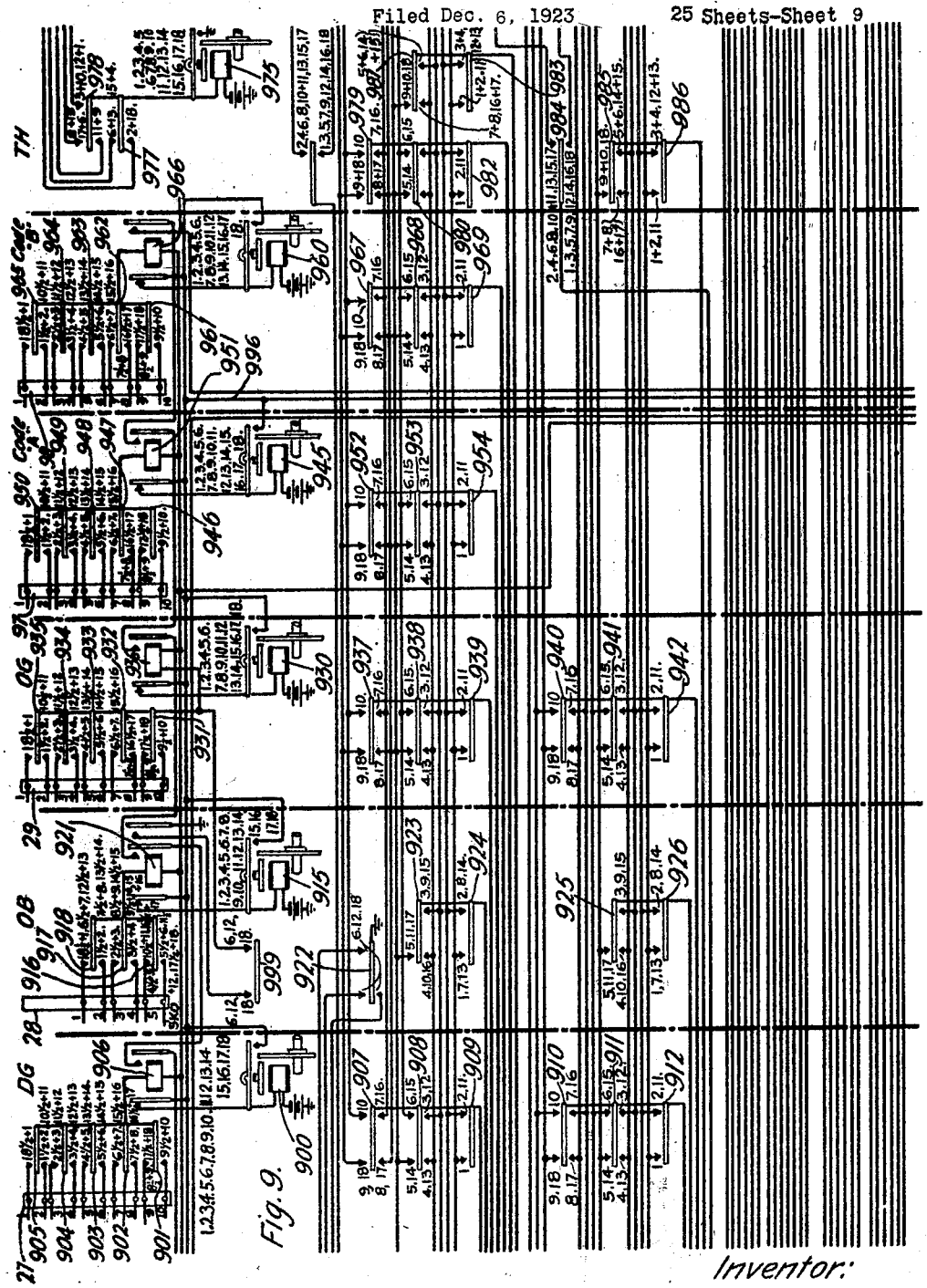

March 2, 1926.                                                          1,575,128
F. N. REEVES
TESTING SYSTEM FOR TESTING SENDERS OF AUTOMATIC EXCHANGES
Filed Dec. 6, 1923            25 Sheets-Sheet 10

*Inventor:*
*Frank N. Reeves.*
by _____ Att'y.

March 2, 1926.
F. N. REEVES
1,575,128
TESTING SYSTEM FOR TESTING SENDERS OF AUTOMATIC EXCHANGES
Filed Dec. 6, 1923
25 Sheets-Sheet 11

Inventor:
Frank N. Reeves
by E.W. Adam
Att'y.

March 2, 1926.  
F. N. REEVES  
1,575,128  
TESTING SYSTEM FOR TESTING SENDERS OF AUTOMATIC EXCHANGES  
Filed Dec. 6, 1923  25 Sheets-Sheet 12

Inventor  
Frank N. Reeves  
by  ⟨signature⟩  Atty.

Fig. 13.

March 2, 1926.　　　　　F. N. REEVES　　　　　1,575,128
TESTING SYSTEM FOR TESTING SENDERS OF AUTOMATIC EXCHANGES
Filed Dec. 6, 1923　　　25 Sheets-Sheet 16

Fig. 16.

Inventor:
Frank N. Reeves.
by E. W. Adams
Att'y.

Inventor:
Frank N. Reeves.

March 2, 1926.

F. N. REEVES 1,575,128

TESTING SYSTEM FOR TESTING SENDERS OF AUTOMATIC EXCHANGES

Filed Dec. 6, 1923    25 Sheets-Sheet 21

Inventor:
Frank N. Reeves.
by [signature]
Att'y.

March 2, 1926.
F. N. REEVES
1,575,128
TESTING SYSTEM FOR TESTING SENDERS OF AUTOMATIC EXCHANGES
Filed Dec. 6, 1923
25 Sheets-Sheet 22

Inventor:
Frank N. Reeves.
by E. W. Adams
Att'y

March 2, 1926.
F. N. REEVES
TESTING SYSTEM FOR TESTING SENDERS OF AUTOMATIC EXCHANGES
Filed Dec. 6, 1923

Inventor:
Frank N. Reeves.
by
Att'y.

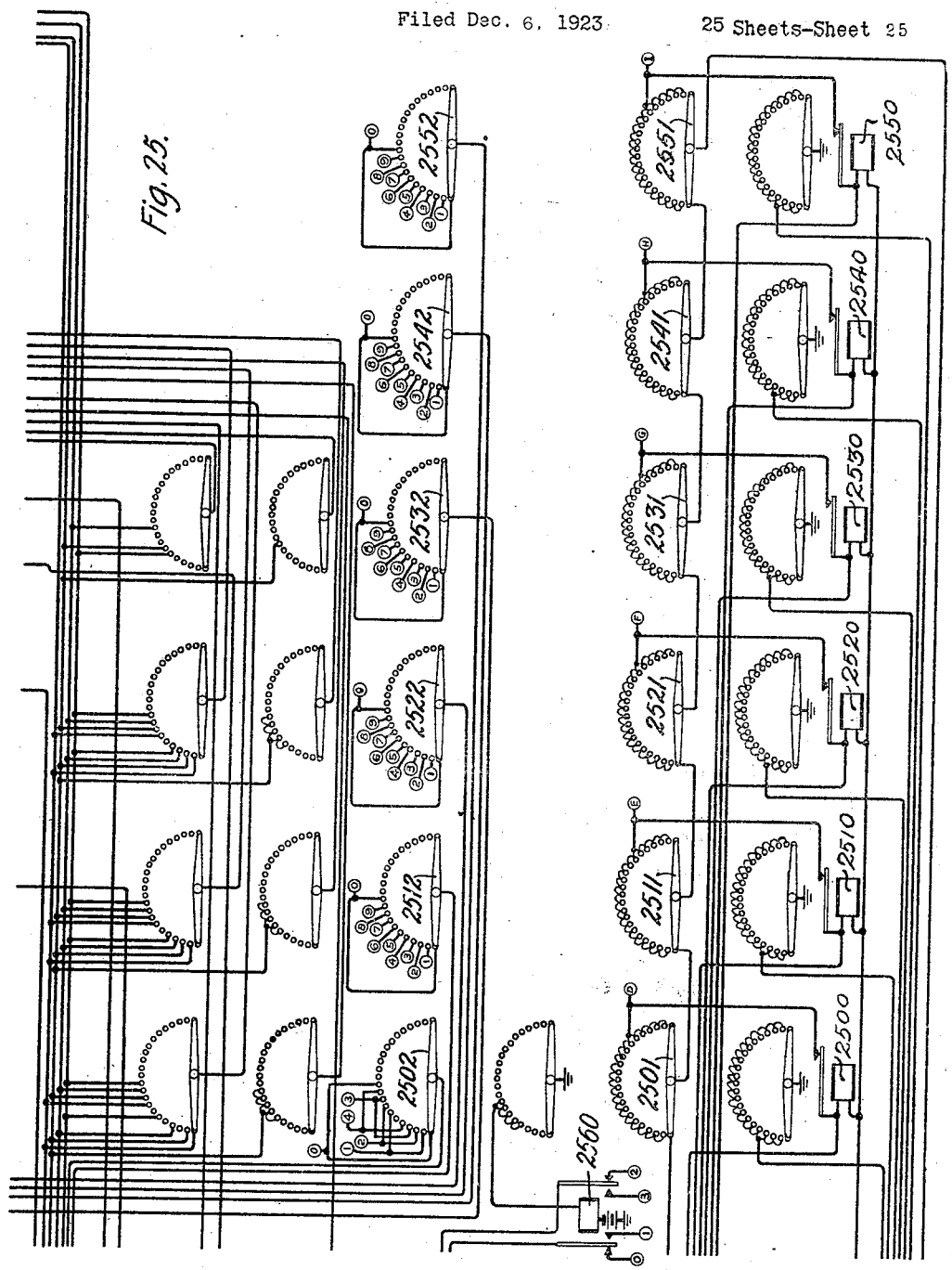

Patented Mar. 2, 1926.

1,575,128

UNITED STATES PATENT OFFICE.

FRANK N. REEVES, OF WOODENSBURG, MARYLAND, ASSIGNOR TO WESTERN ELECTRIC COMPANY, INCORPORATED, OF NEW YORK, N. Y., A CORPORATION OF NEW YORK.

TESTING SYSTEM FOR TESTING SENDERS OF AUTOMATIC EXCHANGES.

Application filed December 6, 1923. Serial No. 678,944.

*To all whom it may concern:*

Be it known that I, FRANK N. REEVES, a citizen of the United States of America, residing at Woodensburg, in the county of Baltimore and State of Maryland, have invented certain new and useful Improvements in Testing Systems for Testing Senders of Automatic Exchanges, of which the following is a full, clear, concise, and exact description.

This invention relates to a telephone exchange system, and more particularly to a testing system for use in a machine switching system for testing senders.

It is an object of this invention to provide an improved testing system.

In offices having machine switching mechanism, senders and selector switches are provided, operable in accordance with a series of interruptions from a dial at a subscriber's station. The senders are provided with apparatus of such nature that a record of the varied dial interruptions is made by the positioning of a plurality of registers. The positioning of the various registers determines the routing of the selector switches to associate the calling with the wanted party. The wanted party may be connected to a line extending from the office in which a call is initiated or it may be connected with a different machine switching office or a manual office. The routing of the call must be determined by the setting of the register switches in response to the dial interruptions. The subscriber's station dial is subject to wear and therefore the speed of dial interruptions must be taken into consideration in the adjustment of the apparatus in the sender for setting the register switches. Since the sender and the registers in the sender are vital portions of the switching system, it is essential that this controlling apparatus be at all times in a high state of mechanical efficiency in order that the percentage of trouble due to inaccurate establishment of connections be maintained as low as possible. For this reason, it is desirable to accurately test the apparatus in the sender that responds to the subscriber's station dial interruptions to maintain it in adjustment to respond to a comparatively wide variation in the speed of dial interruptions.

A feature of this invention is the provision of an automatically progressive testing device to test the ability of the sender of a machine switching office to accurately respond to dial interruptions of various speeds.

This and other features of the invention will be apparent from the following description taken in connection with the accompanying drawings.

While the invention has been disclosed as particularly adapted for testing apparatus of a panel type machine switching office, it is apparent from the following description that the invention has a wider utility and that by slight modification it could be adapted for testing other types of apparatus.

Referring to the drawings, Figs. 1 to 18, inclusive, when arranged in the order illustrated by the diagram in Fig. 26, discloses in detail the circuits and apparatus of a testing device embodying the principle of the present invention, for making an automatically progressive routine test of office senders.

Figs. 19 to 25, inclusive, when arranged in the order illustrated by the aforesaid diagram shows in detail the circuits and apparatus of an office sender of the type which the testing device is designed to test.

Figs. 1, 2, 4 and 5 illustrate relay call indicator apparatus for checking pulses transmitted by the sender into the testing device after the registers of the sender have been set for a call to a relay call indicator office.

Fig. 8 illustrates apparatus to be rotated from position to position to check the operation of the sender during various classes of calls.

Figure 13:
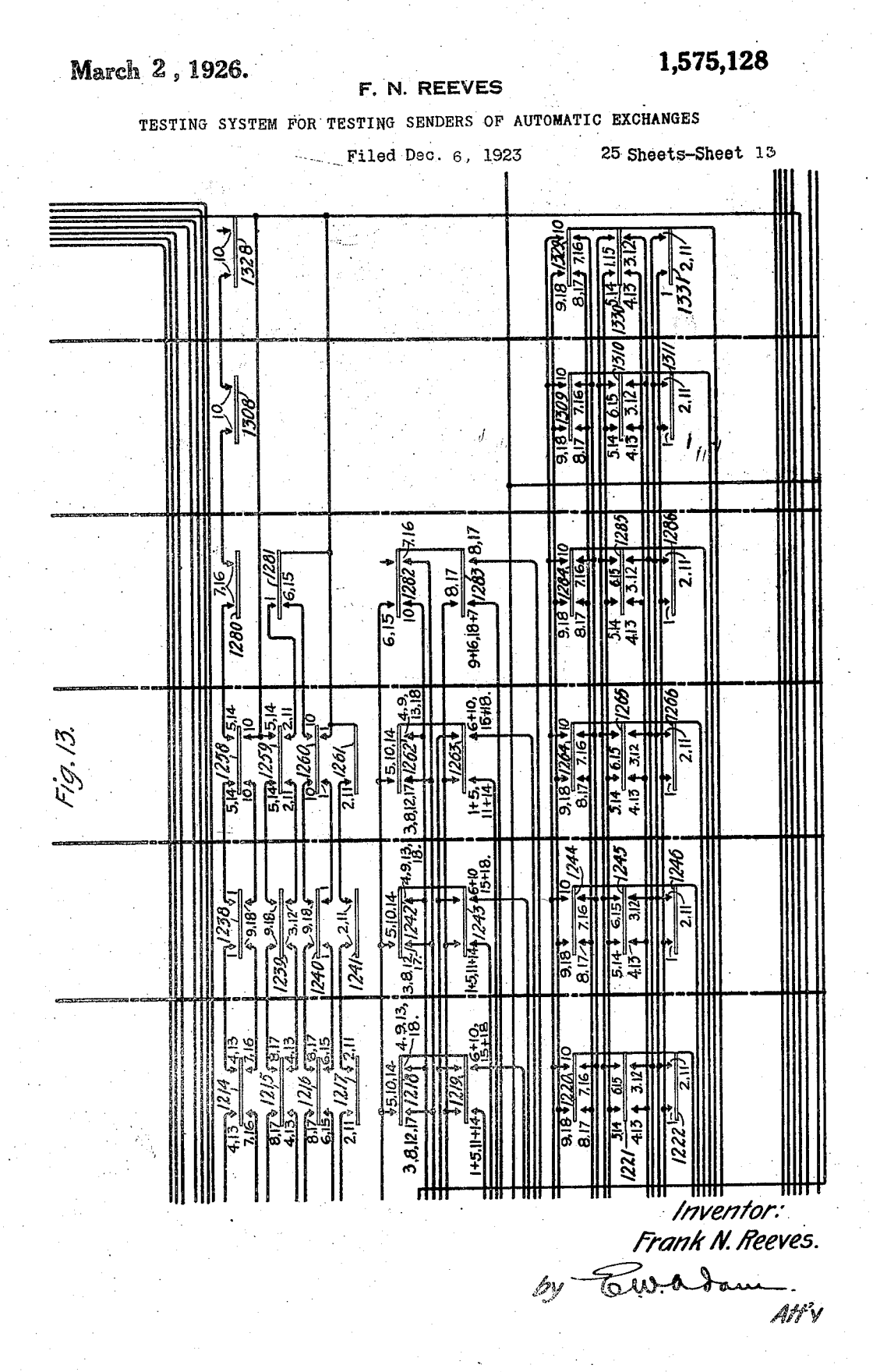

Figs. 9, 10, 12 and 13 illustrate register switches and the slow and high speed pulsing interrupters.

Fig. 16 illustrates the route control switch to control the district office and code register switches in accordance with the routing designation desired in each test.

Figure 11:
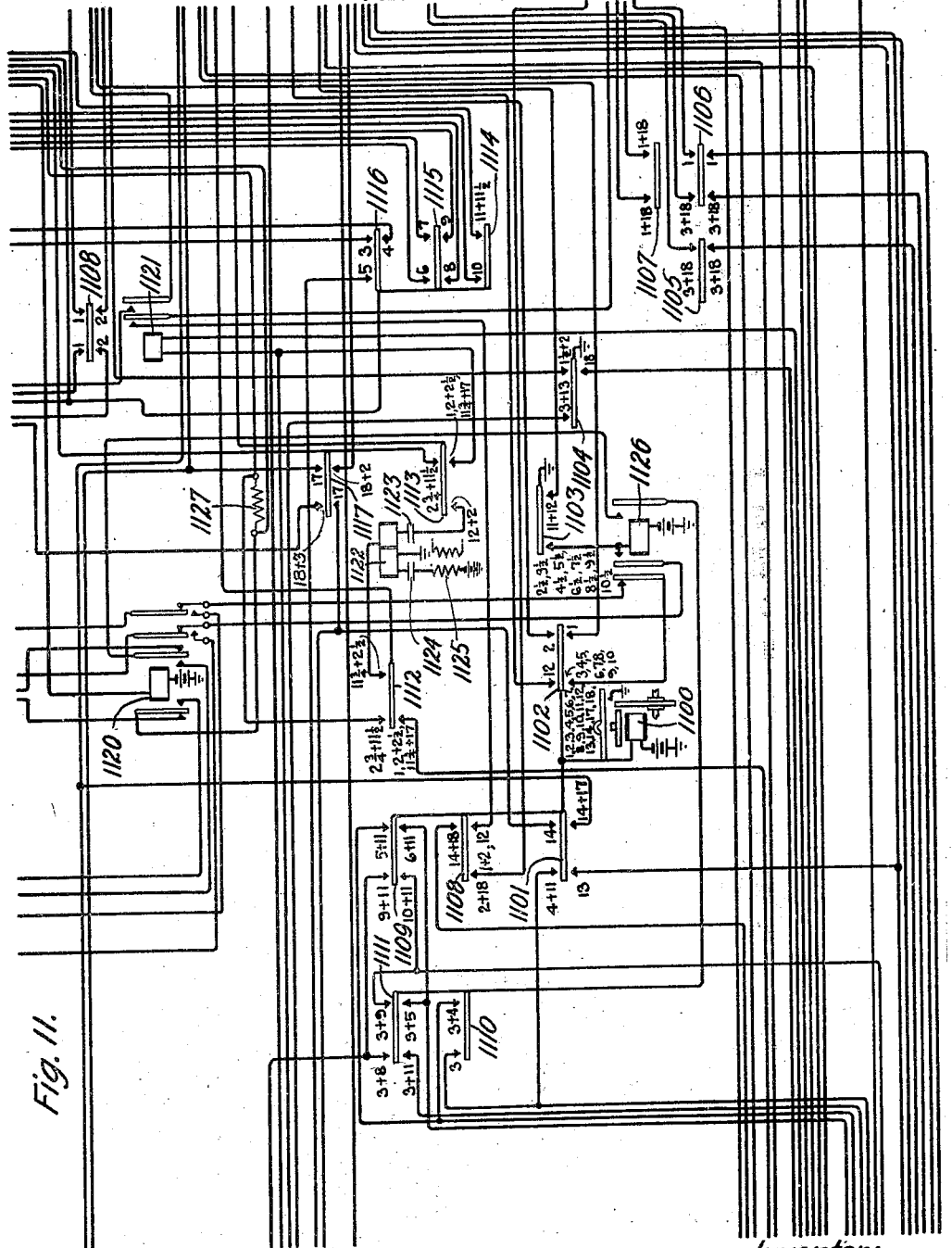
Figure 12:
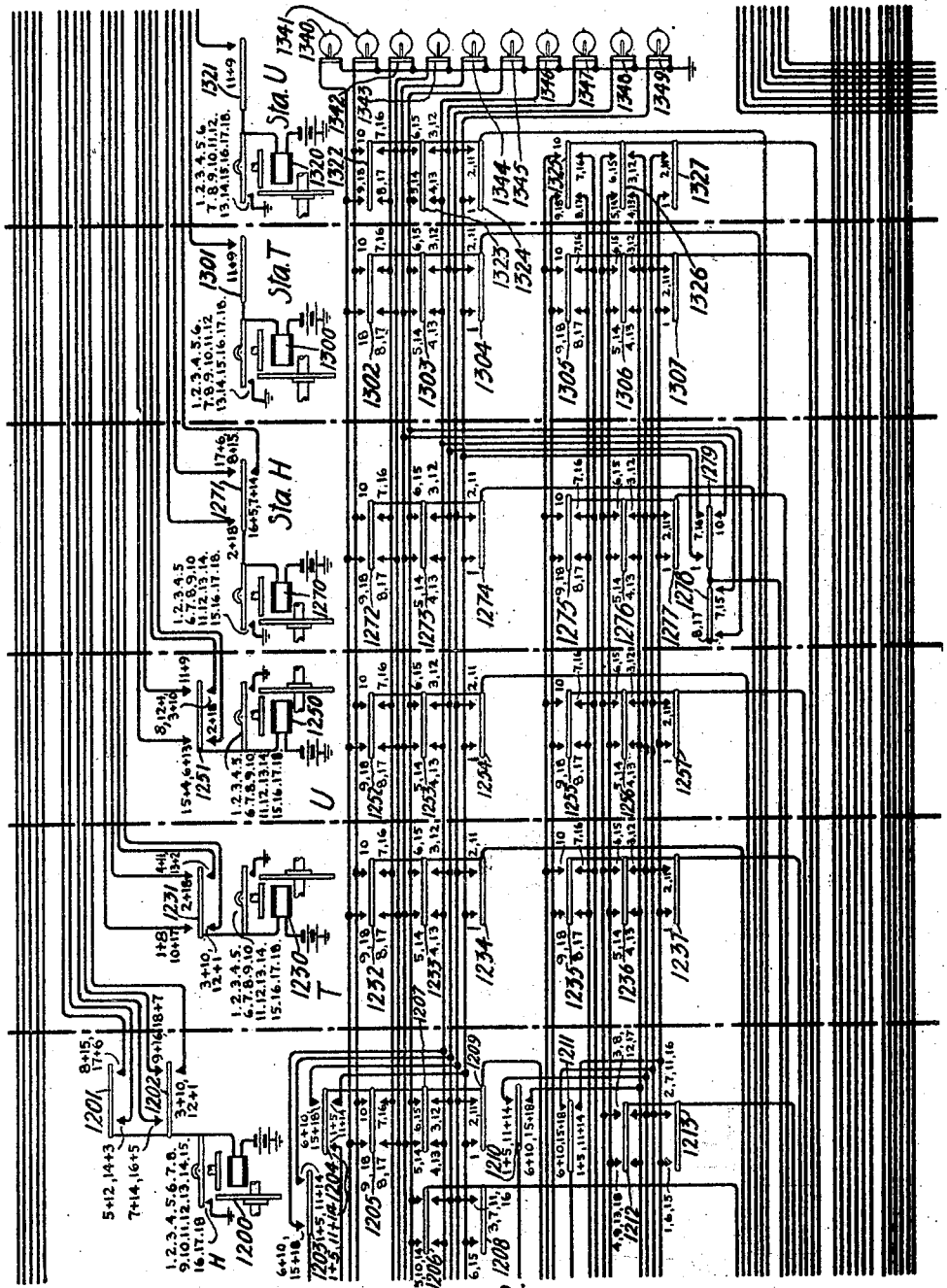

Fig. 11 contains a switch and auxiliary apparatus to progressively associate the register and numerical switches with interrupters 1000 or 1050 and the pulsing circuit to control the setting of the registers in the sender.

Figure 14:
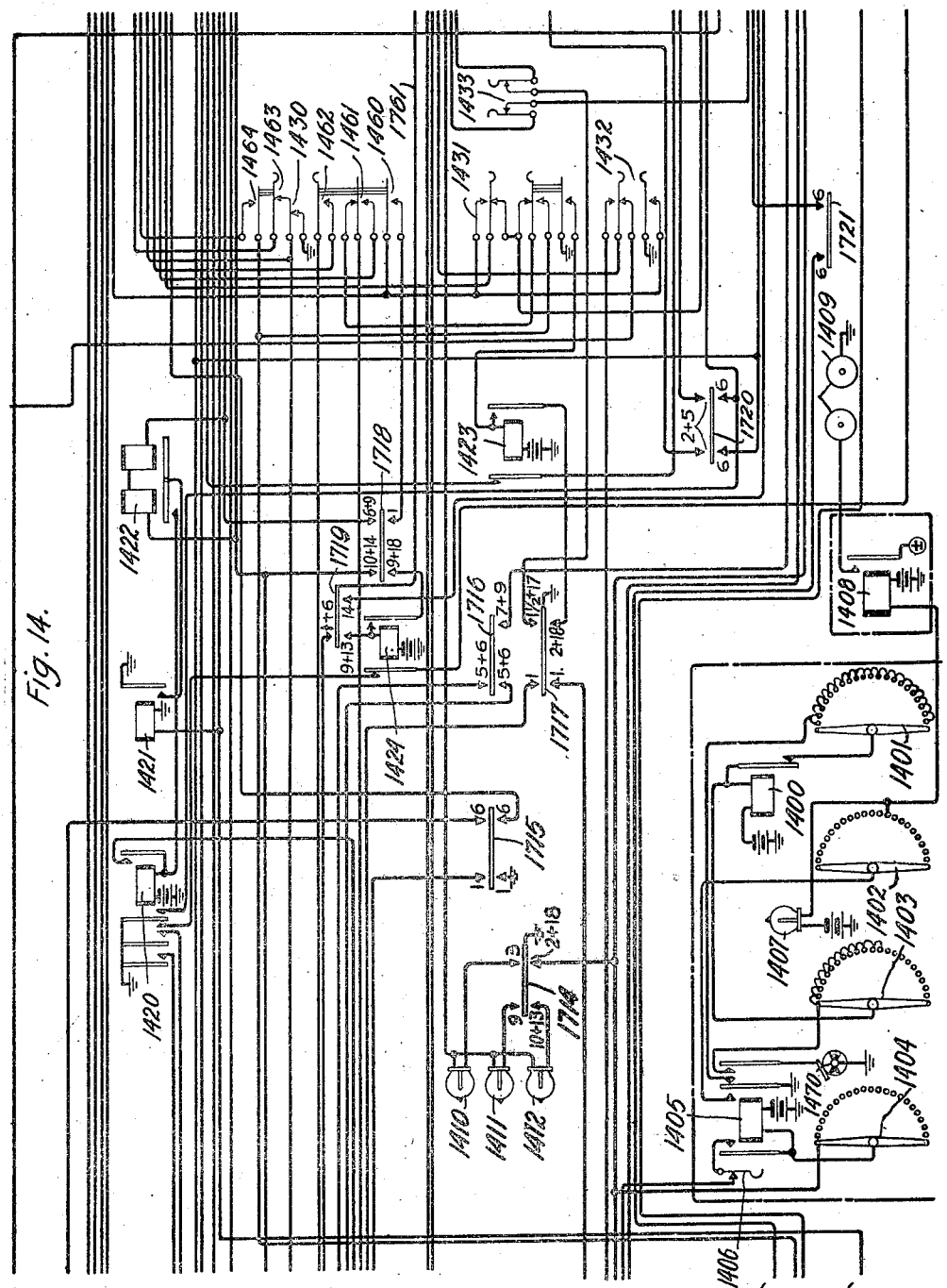

In the lower left portion of Fig. 14 is the time alarm circuit which counts a predetermined time period for each test.

Figure 17:
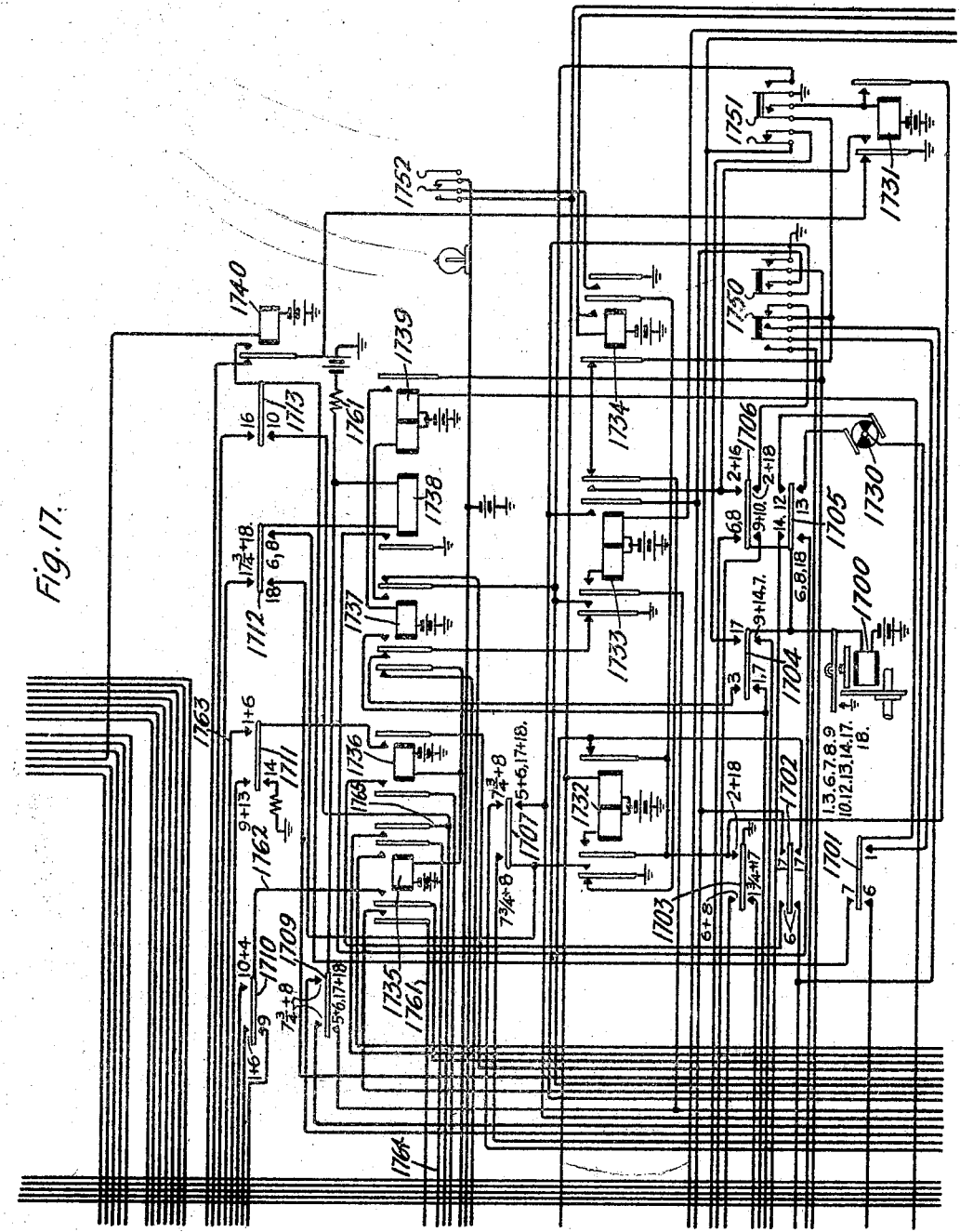
Figure 18:
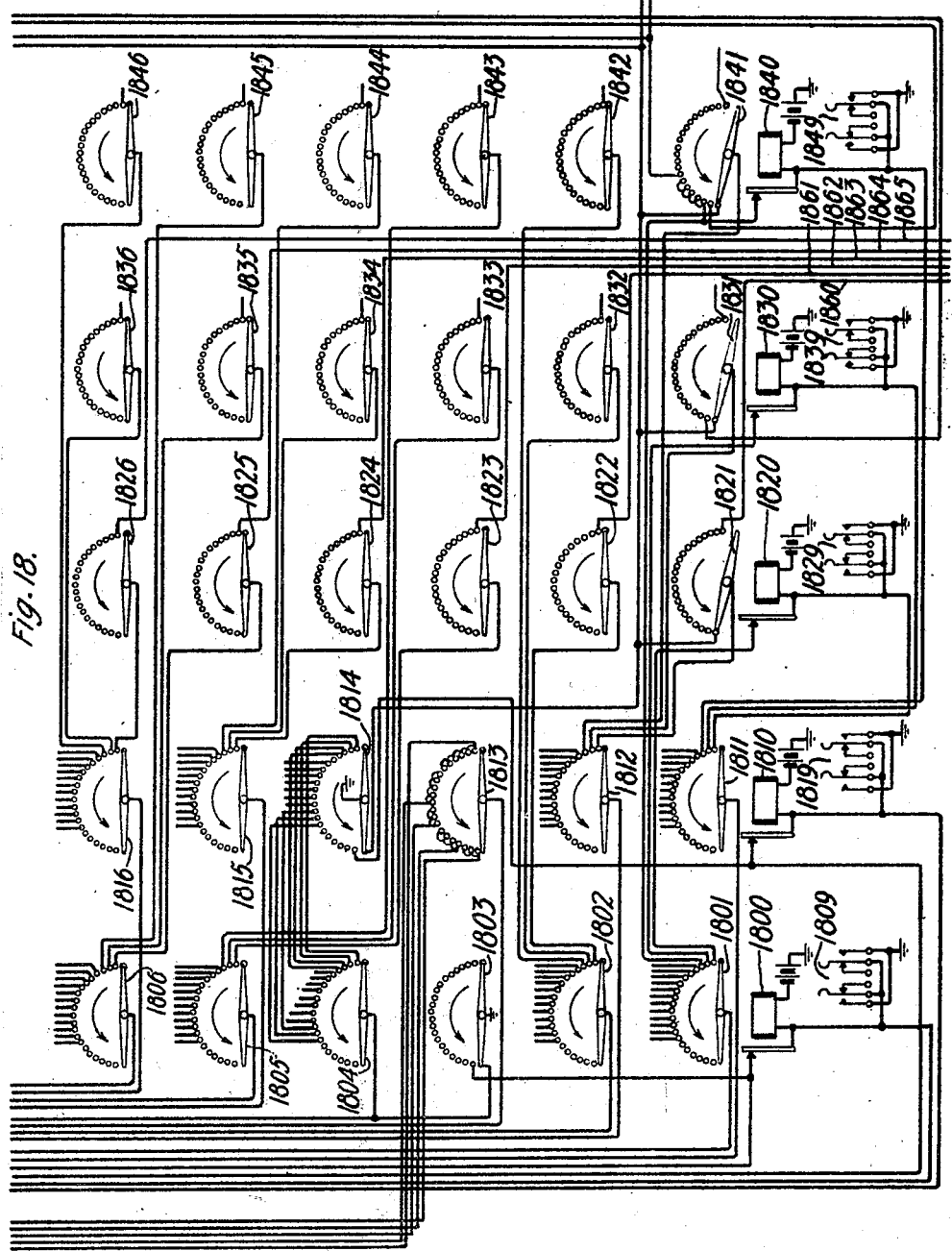
Figure 19:
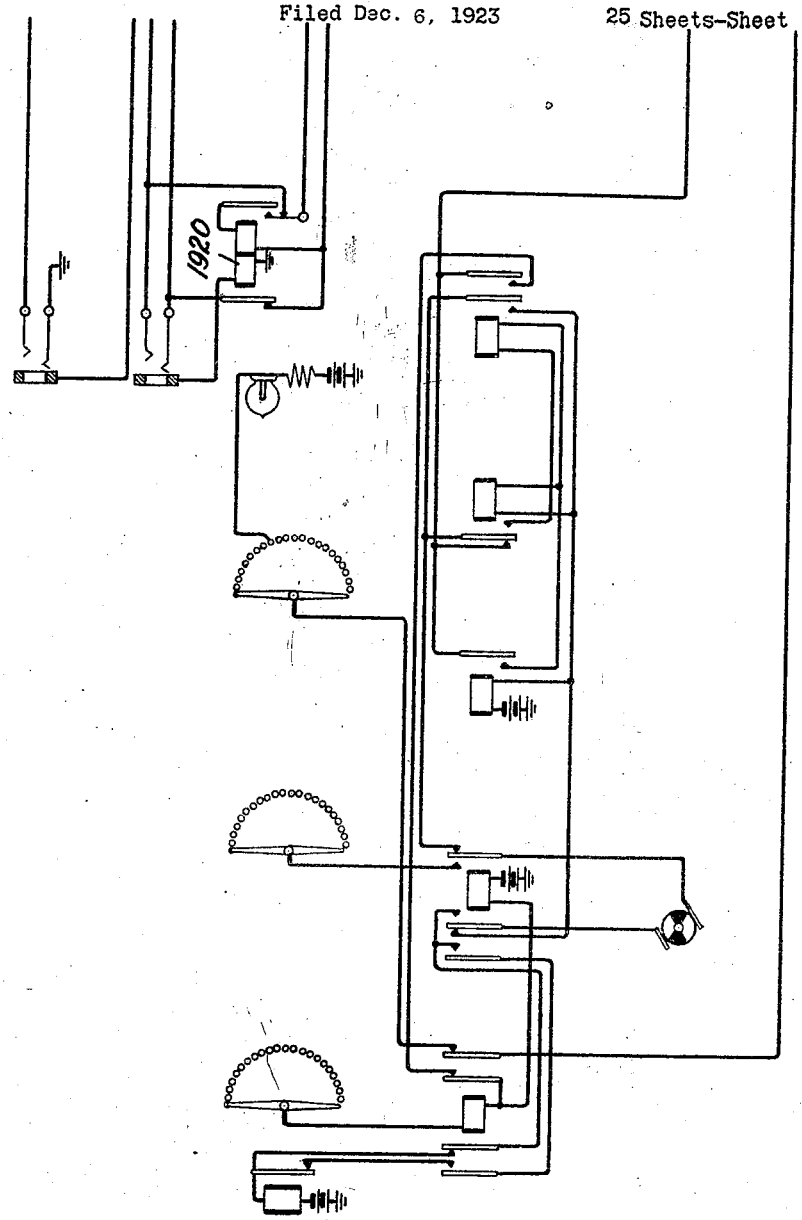

Figs. 17, 18 and upper portion of 14, illustrate the switches and apparatus to progressively associate the testing device with the senders to be tested.

Figure 21:
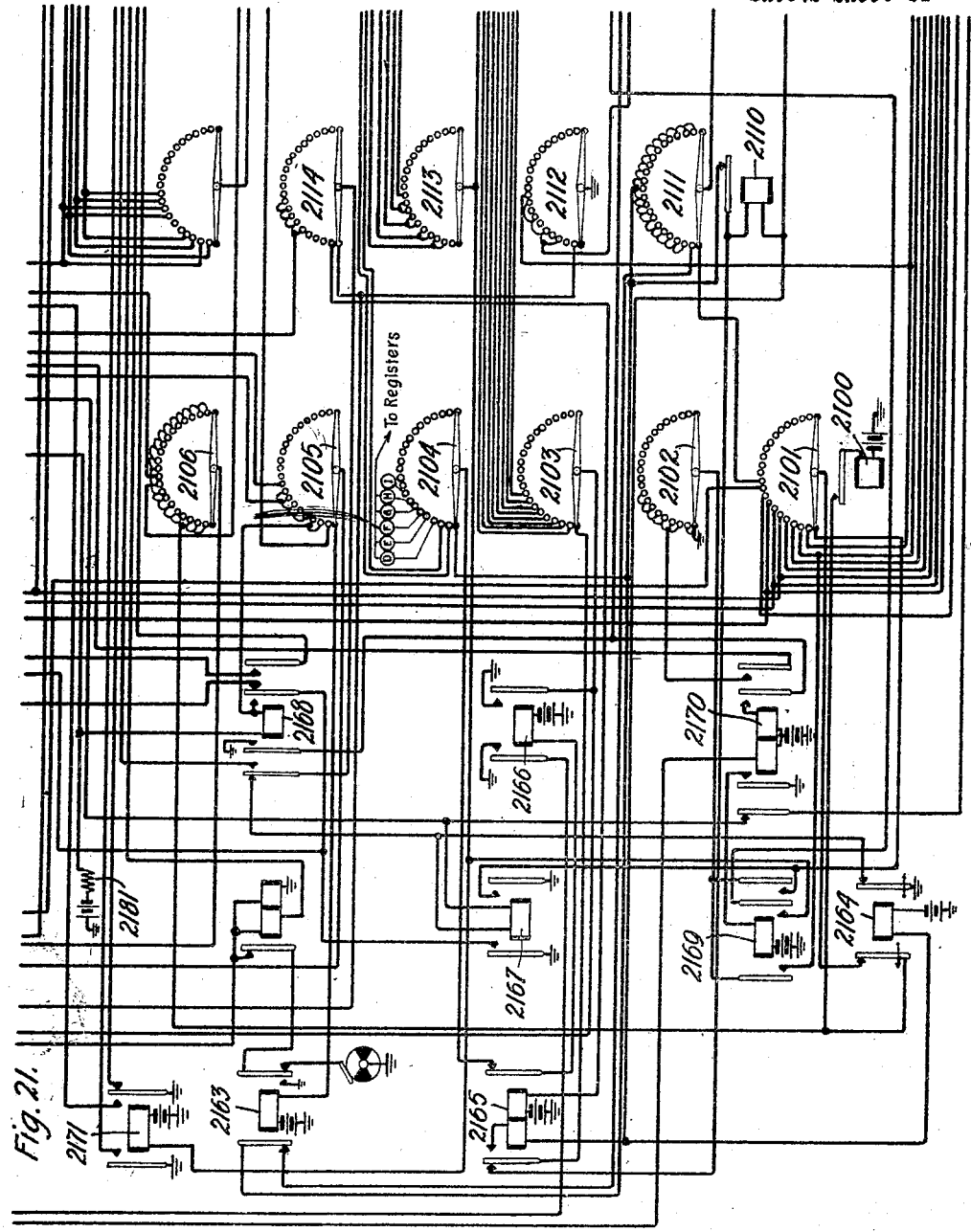
Figure 23:
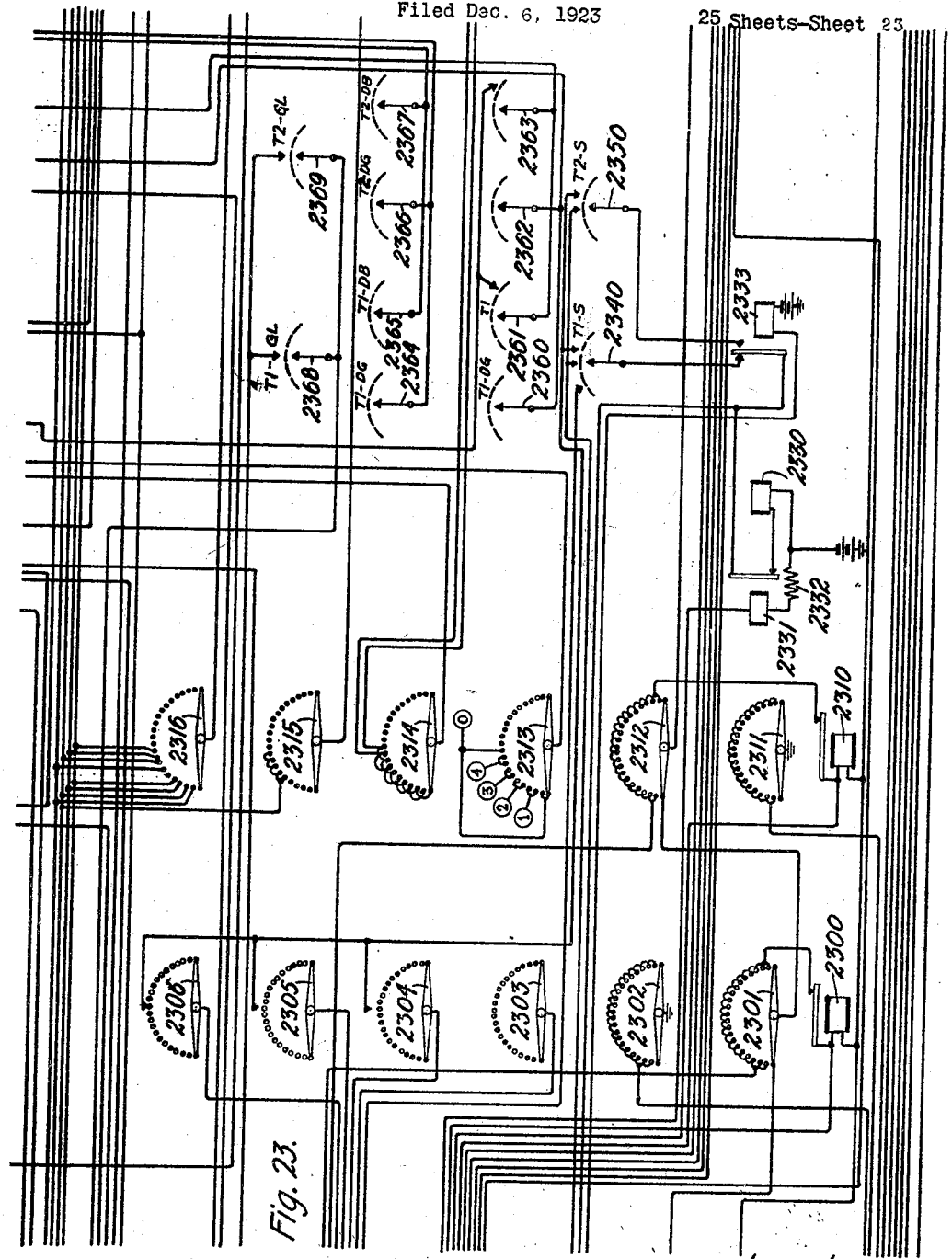

Figs. 21, 23 and 25 illustrate the register switches and the translator switches of a sender to be tested.

Figs. 19, 20, 22 and 24 illustrate the timing circuit, sender class switch circuit, control circuit and relay call indiator pulsing circuit, inclusive.

Fig. 26 illustrates the manner in which the drawings should be arranged.

Description of apparatus.

The apparatus used in Figs. 1 to 17, inclusive, is of the type well known in the art. The registers shown in Figs. 3, 9, 10, 12 and 13 and the control switches shown in Figs. 4, 8, 11, 14, 16 and 17 are of the sequence switch type. The switch associated with the time alarm circuit shown in the lower left portion of Fig. 14, the master switches 1800 and 1810 and the group switches associated with the sender groups are step-by-step switches of a type well known in the art.

The dialing interrupters 1000 and 1050 shown in Fig. 10 are of the sequence switch type. They are, however, driven by accurately timed mechanism to control the number of revolutions per minute. It is well known in the art that the frictional drive sequence switch may have a certain amount of slip through its clutch. Therefore, interrupters 1000 and 1050 are gear driven to prevent possibility of inaccurate timing.

Figure 24:
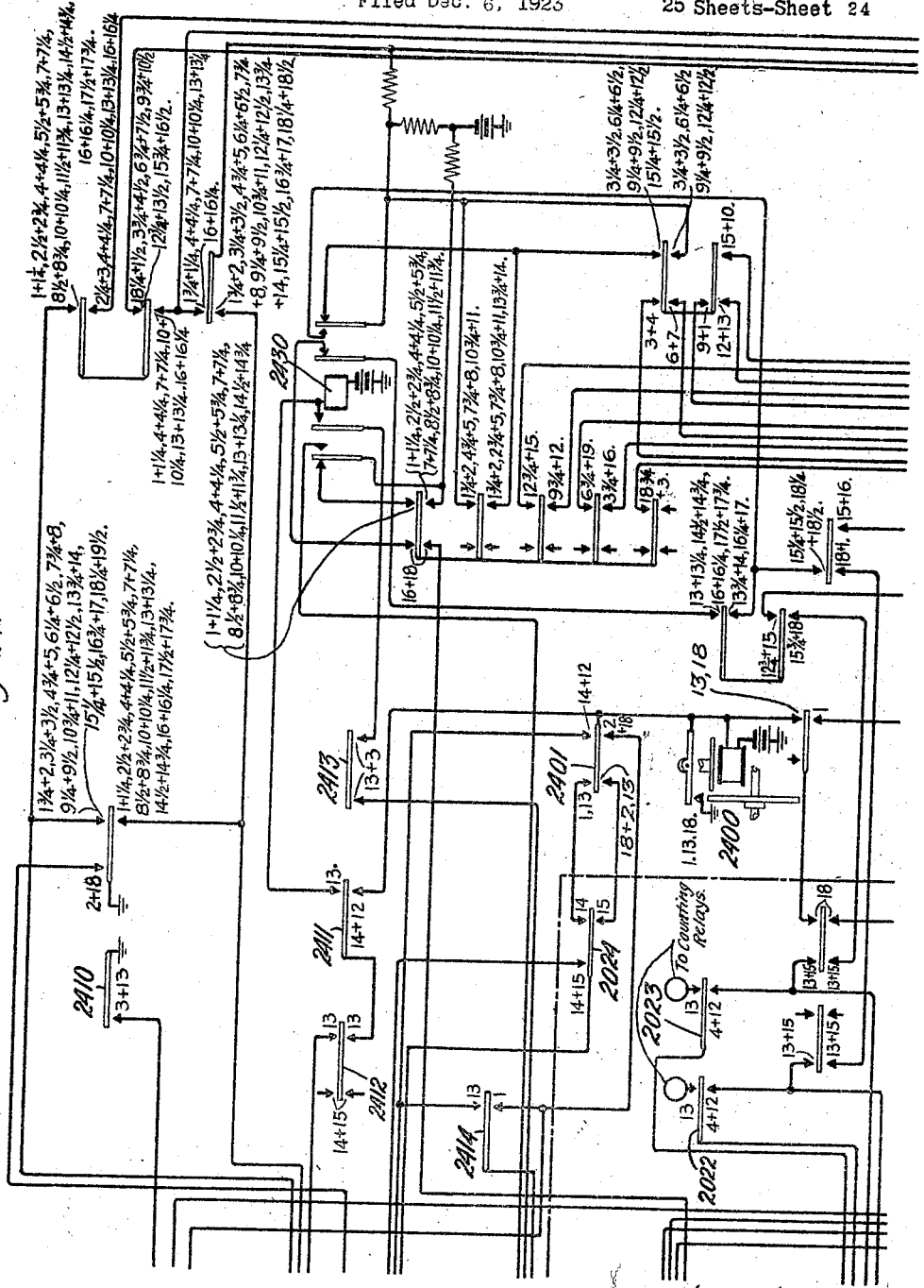

The apparatus shown in Figs. 21, 23 and 25 for use as registers are switches of the step-by-step type, well known in the art. The translator switch shown in Fig. 23 is a power driven switch rotated by the operation of the start magnet 2330 which engages a clutch with a power shaft the rotary movement of the translator being arrested upon the operation of the stop magnet 2331 by opening the energizing circuit of magnet 2330. The class switch shown in Fig. 20, the control switch shown in Fig. 22 and the pulsing switch shown in Fig. 24 are of a sequence switch type, well known in the art.

General description and operation.

Before proceeding with the description of the operation involved in the routine testing of a group of senders, it is believed that a general description of the operation of the testing device will assist in an understanding of the details which follow. The senders in an office of the machine switching type are usually mounted on one or more frames together with selector switches. The routine testing device, which is the subject matter of this invention, is located on an adjacent frame with the lamps and controlling keys positioned on a suitable desk.

Assuming that the apparatus of the testing device is in its normal position, a routine test of the senders in an office is started by the actuation of start key 1750. The operation of various relays follows the actuation of the start key and the sequence switch, Fig. 17, rotates to establish a sequence of circuits to position switches for the test. The master switches 1800 and 1810 are associated with a group switch 1820. The terminals associated with the brush assembly of switch 1820 are connected to the first twenty senders to be tested. Upon the positioning of the master swiches 1800 and 1810 and the group switch 1820, the testing device is brought into association with the first sender to be tested. This sender is now tested to ascertain whether it is in a busy or idle condition. Assuming that it is idle, a relay in the sender testing device is released to associate a ground with the test lead of the sender to maintain it busy so that district selector switches attempting to make a service connection will not seize the sender that is under test.

When a sender has been seized, the route control switch, Fig. 16 is positioned to control the register switches for the first test. The register switches for district brush, district group, office brush, office group, code A, and code B are positioned in accordance with a cross connection from the route control switch, Fig. 16.

Figure 6:
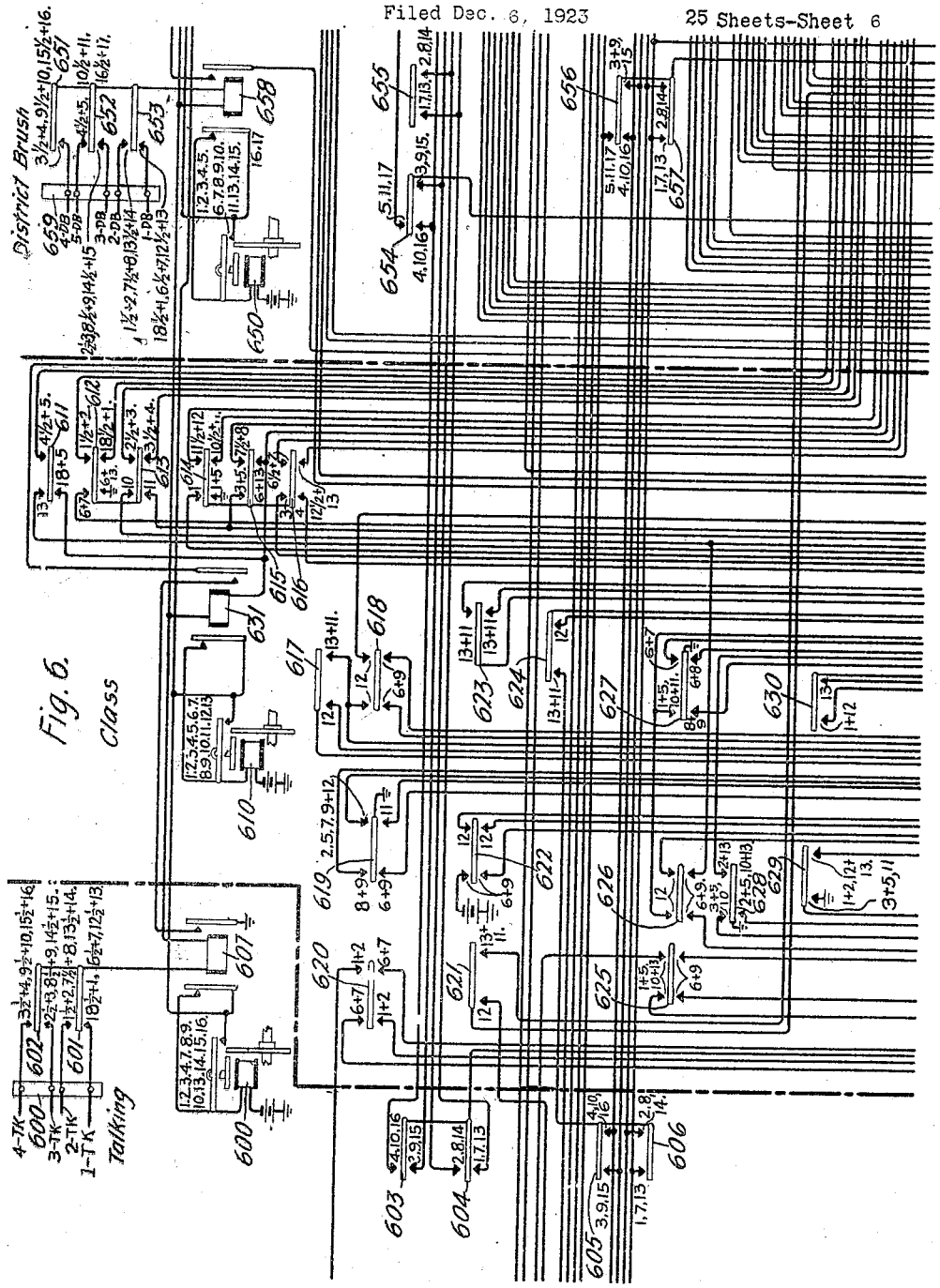
Fig. 6 illustrates switches positioned in accordance with the class of call for checking the talking selection and district brush selection. In the central portion of Fig. 6 a class switch is illustrated which is controlled in accordance with the class of call and is positioned to control other switches in accordance with said class of call.
Figure 15:
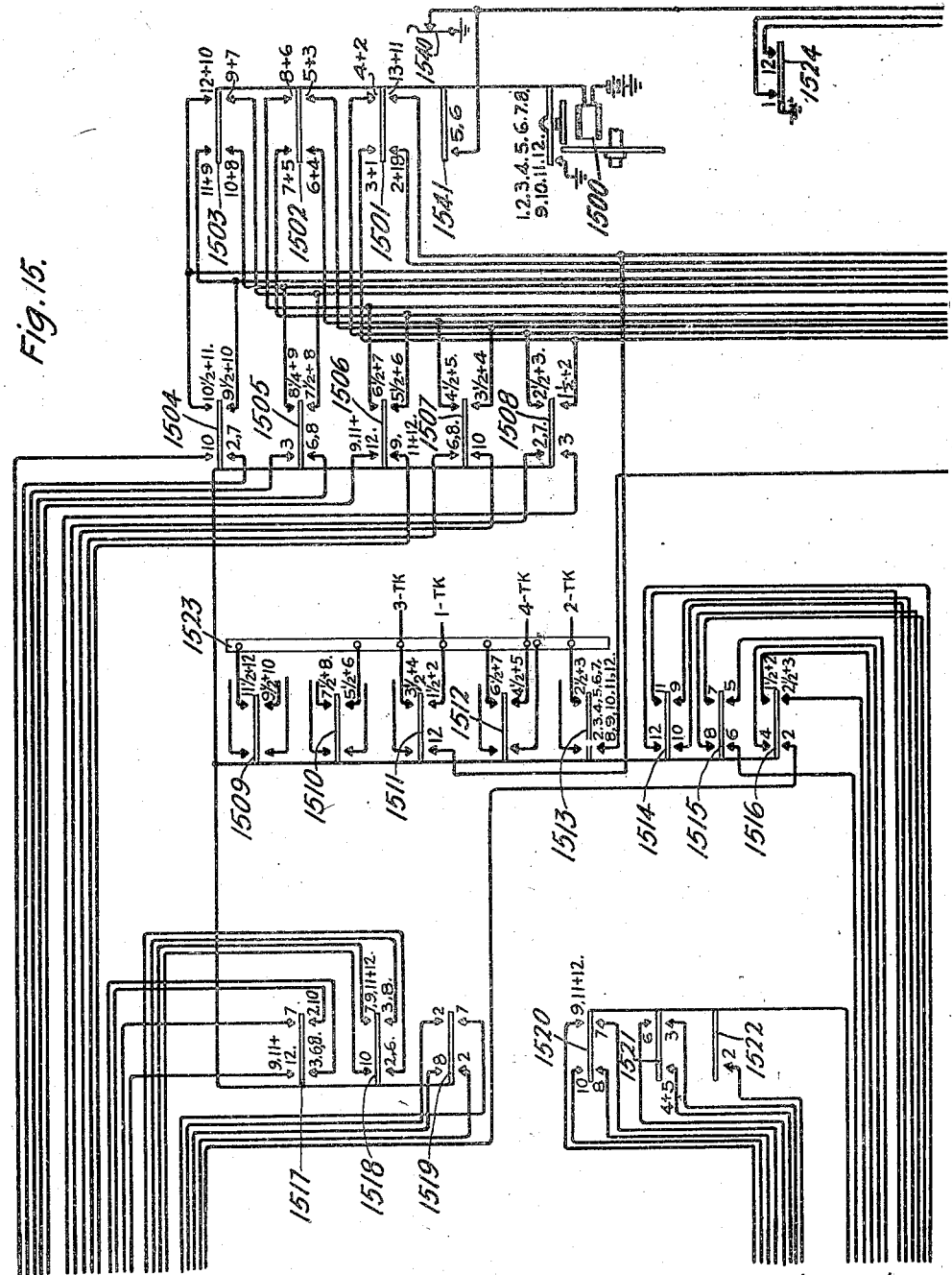
Fig. 15 illustrates a numerical switch to control the setting of the numerical register switches shown in Figs. 9 and 10.

The numerical switch, Fig. 15, is also positioned to control the positioning of the numerical and station register switches and the class switch shown in the central portion of Fig. 6. When the register switches of the sender testing device have been positioned, apparatus is actuated to rotate either interrupter 1000 or interrupter 1050 to set the registers of the sender. Interrupter 1000 is driven by accurately timed mechanism to rotate it to simulate the slowest possible dial interruptions that are ordinarily received by the sender mechanism from a subscriber's dial. Interrupter 1050 is controlled accurately to simulate the most rapid interruptions received from a subscriber's station dial. During the automatic routine test, interrupter 1050 is employed during the first test of the sender. Upon each revolution of interrupter 1050, a series of interruptions is transmitted to the sender to set one register in the manner that it would be set from a subscriber's station dial. Cam 1053 of the interrupter is arranged to release the pulsing relay 2050 ten times upon each revolution, by the use of ten insulated segments. The number of interruptions upon each revolution of the interrupter is supplemented by a short circuit through the cams of the various register switches and numerical switches shown in Figs. 9, 10, 12 and 13. Therefore, the number of interruptions transmitted is through a combination of the interrupter and the cams of a register switch. The first register of the sender to be positioned through the rotation of interrupter 1050 and the cam contacts of register switch 945 is the A code register 2110. The second register of the sender to be set is the B code register 2300. This is also set in accordance with the operation and release of pulsing relay 2050 in accordance with the rotation of interrupter 1050 supplemented by the cam and the cam contacts of the B code register switch 960. The setting of the A and B register switches in the sender control the translator in a manner to position it for district brush, district group, office brush and office group selections. In this same manner, the numerical station registers of the sender are set. The control switch shown in Fig. 11 rotates progressively to associate the register switches of the testing device with the interrupter during the setting of the registers of the sender.

Figure 3:
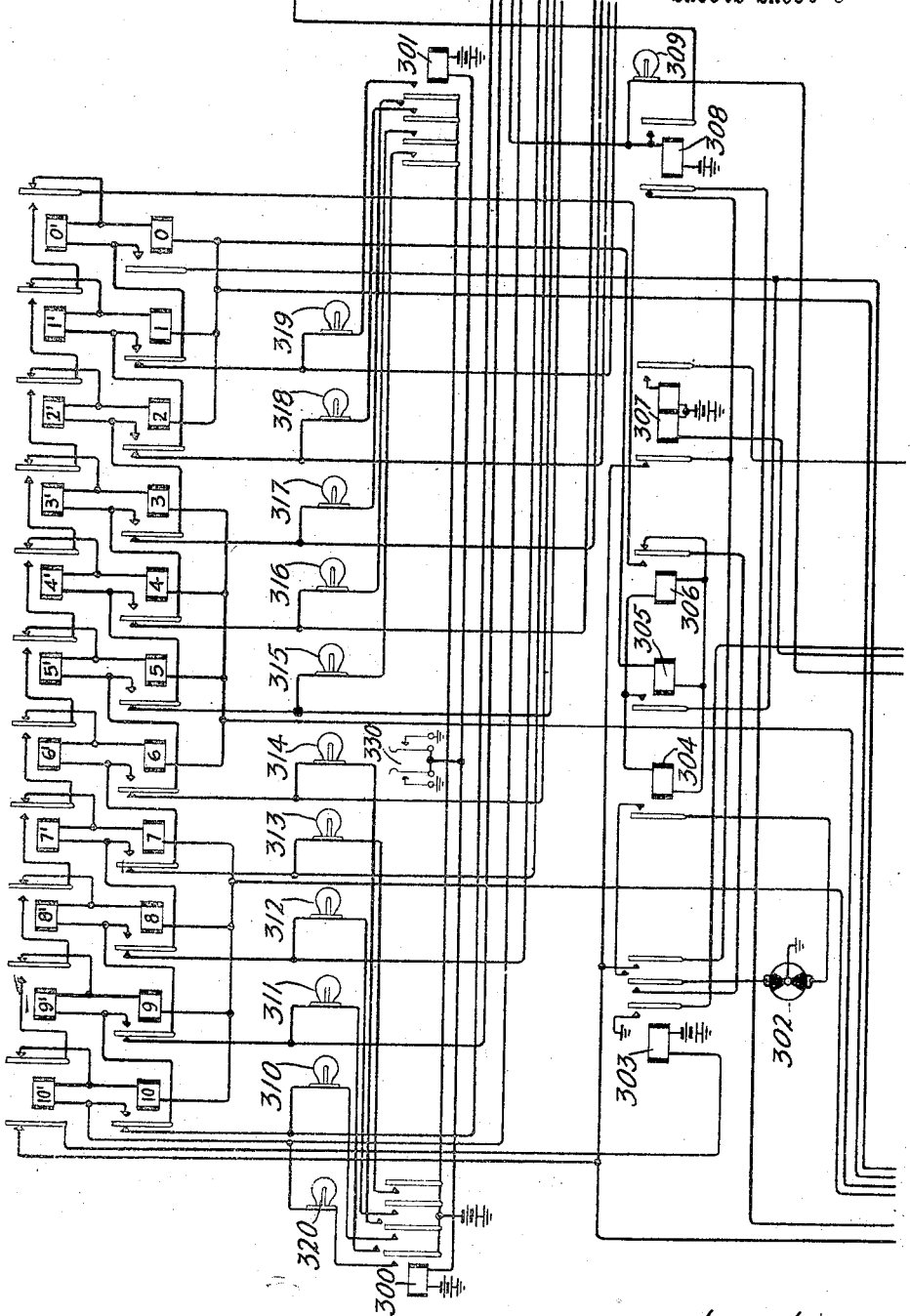
Fig. 3 illustrates counting relays, lamps and other apparatus to check the control apparatus of the sender when the registers of the sender are set to control selector switches for a full mechanical call.

The sender under test now attempts to control selector switches in accordance with the positions assumed by its registers and since the sender is associated with the testing device instead of with selector circuits, the attempted control of selector switches is recorded and checked by the testing device. During the operation of a machine switching selector switch, as is well known in the art, the fundamental circuit is established to operate a relay in the selector circuit and a stepping relay in the sender circuit. The selector switch elevator is then driven upward to associate a brush with conducting and non-conducting portions of a commutator to shunt the stepping relay in the sender. This function of the selector switch is simulated in the testing device by the use of relay 303 to replace the relay of the selector switch to be actuated in series with the stepping relay of the sender. Interrupter 302 simulates the selector switch commutator. Upon the operation of a series of counting relays in the sender in accordance with the setting of the register, the same number of counting relays are operated in the testing device as shown in Fig. 3. When a sufficient number of counting relays in the sender are operated, the O, BO and FO counting relays of the sender open the fundamental circuit and rotate the control switch of the sender for the second test. When the fundamental circuit is then opened relay 303 of the testing device releases and the operation of the counting relays in the testing device is arrested. It will be recognized that since the registers of the sender are set in accordance with the setting of the register switches in the testing device, the number of counting relays actuated in the sender for a given selection must be in accordance with the setting of the register switches of the testing device. Therefore, to check the correct operation of the sender, the correct number of counting relays must be operated in the sender to establish a circuit through the contacts of the register switch in the testing device to operate a relay forming a circuit to rotate the check switch in the testing device to make the next progressive test. The setting of each register of the sender is checked in this manner upon its attempted control of a selector switch to ascertain whether it is capable of properly responding to subscriber's station dial interruptions and control selector switches in accordance with the dial interruptions received.

A plurality of tests are usually made upon each sender by the operation of key 1430. Therefore, upon completion of test No. 1 certain switches of the testing device are rotated to reset the route control switch, Fig. 16, and the numerical switch, Fig. 15. Test No. 1 includes the setting of the station registers to simulate the routing of a call through offices other than the one in which the call is initiated. The second test to be made sets the code and numerical registers without stations to route a call to a subscriber's station in the machine switching office initiating the call. This is made in a similar manner to that described with the exception that the station registers of the sender are not set.

Figure 5:
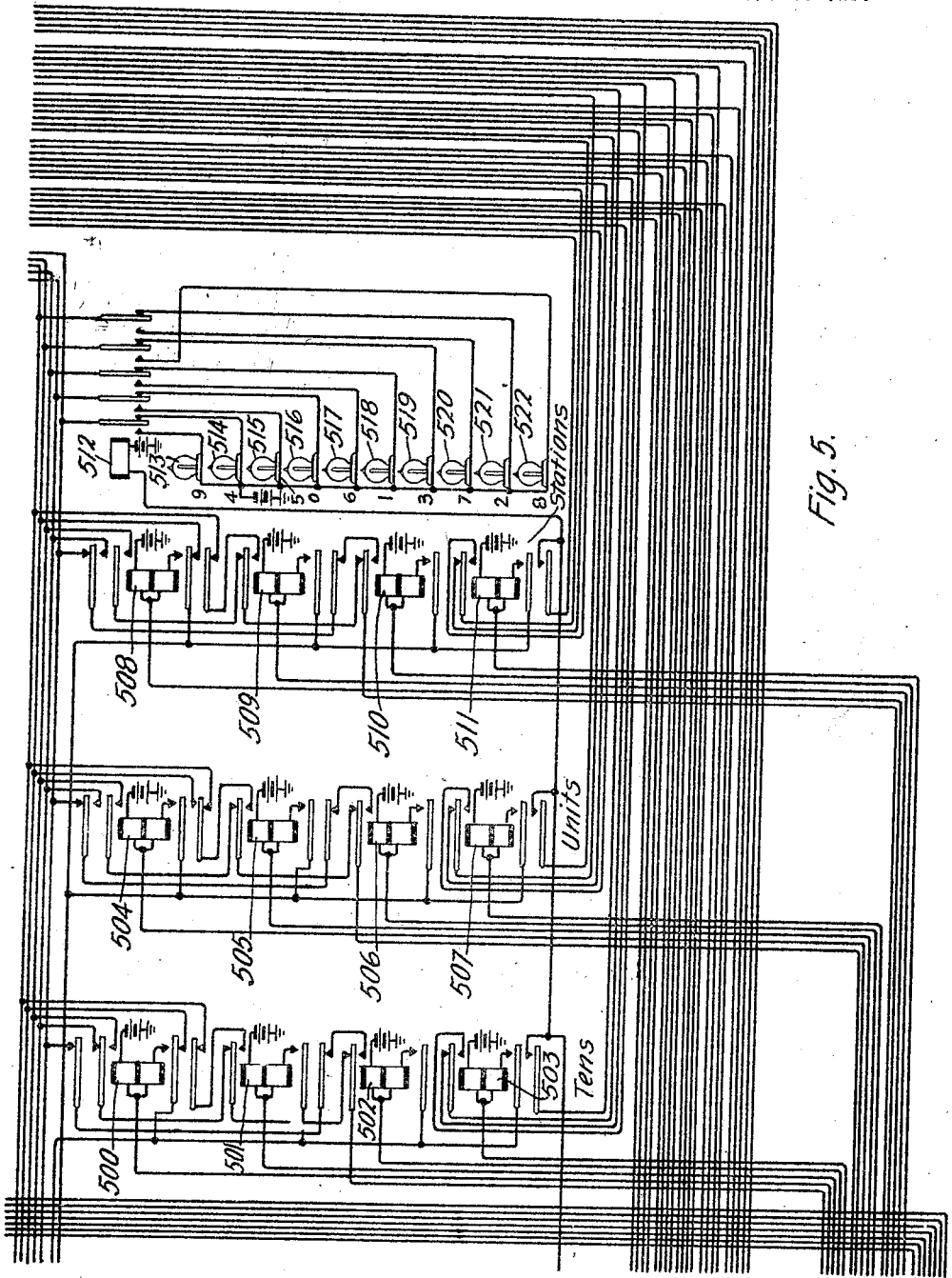

One of the tests included in the multi-test which differs from the ordinary machine switching control is in the control of the sender for a call to a relay call indicator office. For this type of test, the registers are set in a similar manner to that described with the exception that the register switches of the testing device are differently positioned by the route control and numerical switches shown in Figs. 15 and 16. The registers of the sender are thus positioned to operate relay call indicator apparatus in a distant manual office and the translator is positioned to route the district and office selector switches to a relay call indicator trunk. The operation of the testing device to check the district brush, district group, office brush and office group selections is the same as previously described. Upon the completion of the office group selection the fundamental circuit is transferred to the relay call indicator apparatus, shown in Figs. 1, 2, 4 and 5. To control relay call indicator apparatus from the sender, the pulsing switch shown in Fig. 24 is actuated to transmit various pulses to the polarized relays 117, 118 and relay 120 of the relay call indicator apparatus. In this manner the register relays shown in Fig. 1 and certain of the lamp relays shown in Figs. 2 and 5 are operated in the same manner as they would be operated in a relay call indicator office. The lamp, to indicate a number or code, is lighted as each number or code is checked by the testing device. It is the practice in relay call indicator offices to light a plurality of lamps to indicate the complete number and code.

A check of the correct operation of the relay call indicator pulses sent out by the sender is made from the various positions of the impulse switch, Fig. 4. Its rotation progressively associates the lamp relays with the register switches of the testing device, and a lamp, shown in Fig. 5, is lighted to indicate the setting of the lamp relays in each of the progressive positions of the impulse switch, Fig. 4. It is necessary that the lamp relays be positioned in accordance with the setting of the registor as controlled by the register switch in the testing device to progressively rotate the impulse switch, Fig. 4 and the check switch, Fig. 8. The circuit to light each lamp shown in Fig. 5 is established through the register switches and lamp relay contacts. When the pulses sent out by the sender set the lamp relays incorrectly, a circuit is not established, to rotate the impulses and check switches, to check the next successive set of pulses and therefore the progressive movement of the testing device is arrested and an alarm is sounded. A lamp, shown in Fig. 5, is lighted to indicate the number sent incorrectly by the sender.

When the registers of the sender are set for a tandem relay call indicator call, a check is first made of the tandem tens selection and one of lamps 514 and 522, inclusive, is lighted to indicate the setting of the tandem tens relays 200 to 203, inclusive. In this manner, upon the check of the setting of the tandem units relays or the thousand relays, etc., one of lamps 514 to 522, inclusive, is lighted. It will be recognized that this lamp indication is quite different from the ordinary relay call indicator lamp indicating device since only ten lamps are used in this circuit to indicate the success of any number of selections. These lamps as controlled through the setting of the register switches, are sufficient to indicate the success of a test or a failure.

Upon the completion of a multi-test of a sender the group switch 1820 is advanced to a second sender to be tested.

Detail description of operation.

Let it be assumed that the sequence switches and other apparatus in this testing device, sheets 1 to 18, are in their normal positions, and that the test man desires to start a routine test of a group of senders, one of which is disclosed in Figs. 19 to 25 inclusive. Also let it be assumed that a plurality of tests is to be made of each sender in the group of senders. To make a plurality of tests of each sender, the multi-test key 1430 shown in Fig. 14 is operated. The actuation of key 1750 shown in Fig. 17 starts a routine test of a group of senders.

The actuation of the start key 1750 establishes a circuit to operate start relay 1739, from grounded battery through the right winding of relay 1739, right lower contact of cam 1701, left outer contacts of key 1750, right upper and lower contacts of cam 1106, left upper and lower contacts of cam 804, lower contacts of cam 403, lower contact of cam 1657, to ground through the left upper contact of cam 1524. The operation of relay 1739 establishes a circuit to operate relay 1737 from grounded battery, through its winding, contacts of relay 1739 to ground through the right outer contacts of key 1750. Relay 1737 in attracting its left inner armature, establishes a circuit to rotate sequence switch 1700 from position 1 to position 2. This circuit may be traced from grounded battery, through the winding of magnet 1700, left lower contact of cam 1704, left inner contacts of relay 1737, to ground through the left outer normal contacts of relay 1733. The sequence switch 1700 now rotates to position 3 under the control of its magnet contact. During its rotation through position 2, a circuit is established to operate relay 1732, from grounded battery through its right winding, upper contacts of cam 1720, brush 1814, and its associated contact to ground. Relay 1732 in attracting its left inner armature, establishes a locking circuit for itself from grounded battery through its left winding, left inner contacts to ground through the right upper contact of cam 1703. The rotation of sequence switch 1700 opens the actuating circuit for relay 1739 to cause its release. The release of relay 1739 opens the actuating circuit for relay 1737, to cause its release.

The release of relay 1737 establishes a circuit to rotate the sequence switch 1700 to position 4. This circuit may be traced from grounded battery, through the winding of magnet 1700, left upper contact of cam 1704, left inner normal contacts of relay 1737 to ground through the left outer normal contacts of relay 1733. The sequence switch now rotates from position 4 to position 6 under the control of its magnet contact. Since relay 1732 has remained in an operated position, a circuit is established through its contacts in position 6 of sequence switch 1700 to operate relay 1738. This circuit may be traced from grounded battery, through resistance 1761, winding of relay 1738, right lower contact of cam 1712, to ground through the left outer contacts of relay 1732. The operation of relay 1738 establishes a circuit to rotate the sequence switch 1700 from position 6 to position 7. This circuit may be traced from grounded battery, through the winding of magnet 1700, left lower contact of cam 1705, to ground through the contacts of relay 1738. The actuating circuit for relay 1738 is now opened to cause its release. A circuit is established in position 7 to rotate the sequence switch into position 8. This circuit may be traced from grounded battery through the winding of magnet 1700, right lower contact of cam 1704, normal contacts of relay 1740 to ground through the left normal contacts of relay 1731.

The magnets of master switches 1800 and 1810 are now energized. The circuit established to energize the magnet of master switch 1800 may be traced from grounded battery, through the magnet winding of switch 1800, left upper contact of cam 1707 to ground through the left outer contacts of relay 1732. The circuit established to actuate the magnet of master switch 1810 may be traced from grounded battery, through the magnet winding of the master switch 1810, right upper contact of cam 1707 to ground through the left outer contacts of relay 1732. An operating circuit is established for relay 1738 the same as previously traced. A shunt circuit is also established to prevent the operation of relay 1738 until the magnets 1800 and 1810 have attracted their armatures. This shunt may be traced from the operating grounds for magnets 1800 and 1810 through the armatures and contacts of said magnets, upper contacts of cam 1709, resistance 1761 to grounded battery. Upon the actuation of magnets 1800 and 1810, this shunt is removed to allow the operation of relay 1738. The operation of relay 1738 establishes a circuit to rotate the sequence switch 1700 from position 8 to position 9. This circuit may be traced from grounded battery through the winding of magnet 1700, left lower contact of cam 1705, to ground through the contacts of relay 1738.

The sequence switch upon rotating from position 8 to position 9 opens the actuating circuit for the magnets of master switches 1800 and 1810 to cause their release. The release of the magnets cause the rotation of the brushes from their normal position to position 1, in the well known manner of operating such switches. The rotation of the master switches to position 1 associates the testing device with the first group switch 1820. The terminals of this group switch are associated with twenty senders. The rotation of sequence switch 1700 from position 8 to position 9 also opens the actuating circuit for relay 1738, to cause its release.

The sequence switch 1700 is now rotated to position 15. The energizing circuit may be traced from grounded battery through the winding of magnet 1700, right lower contact of cam 1704, normal contacts of relay 1740 to ground through the left normal contacts of relay 1731. A circuit is established through the magnet contact to rotate the sequence switch from position 15 to position 17. In this position of the sequence switch, a test is made to ascertain whether group switch 1820 is in its normal position. The circuit established to make this test rotates sequence switch 1700 from position 17 to position 18. This circuit may be traced from grounded battery, through the winding of magnet 1700, right upper contact of cam 1704, left contacts of key 1751, brush 1821 and its associated contact, lower contact of cam of relay 1737, right contacts of key 1433, to ground through the right upper contact of cam 1717. In position 18, a circuit is established to energize group switch magnet 1820 from grounded battery, through the winding of magnet 1820, brush 1811 and its associated contact, lower contact of cam 1707 to ground through the left outer contacts of relay 1732. An energizing circuit is also established for relay 1738 from grounded battery through resistance 1761, winding of relay 1738, upper contact of cam 1712, left normal contacts of relay 1423, right inner contacts of key 1750, lower contact of cam 1707 to ground through the left outer contacts of relay 1732. A shunt circuit prevents relay 1738 from operating until magnet 1820 has attracted its armature. The shunt circuit may be traced from the operating ground for magnet 1820 through the contacts of magnet 1820, brush 1801 and its associated contact, lower contact of cam 1709, resistance 1761 to grounded battery. Magnet 1820 now attracts its armature and since the shunt is removed from the winding of relay 1738, it operates. The operation of relay 1738 establishes a circuit to rotate sequence switch 1700 from position 18 to position 1. This circuit may be traced from grounded battery, through the winding of magnet 1700, left lower contact of cam 1705 to ground through the contacts of relay 1738. The rotation of the sequence switch from position 18 to position 1 opens the actuating circuit for switch magnet 1820 to cause its release. Brushes 1821 to 1826, inclusive, are now rotated from their normal position to position 1, to associate the testing device with the first sender to be tested. The holding circuit for relay 1732 is also opened to cause its release.

In position 1 of sequence switch 1700, a circuit is again established to operate relay 1737 over the circuit path previously traced. The operation of relay 1737 establishes a circuit to operate relay 1739 the same as previously traced. The operation of relay 1739 establishes a circuit to rotate the sequence switch 1700 from position 1 to position 3 to start a second revolution of the switch. The circuit for rotating sequence switch 1700 is the same as previously traced. In sequence switch position 3, the sender associated with the testing device through the terminals of switch 1820 is tested to ascertain whether it is in a busy or idle condition. A busy sender is characterized by a ground connected to conductor 1860 as described in an application to A. E. Lundell, Serial No. 487,520, filed July 26, 1921. An idle sender is characterized by the absence of ground on this conductor. Upon the association of the testing device with the sender characterized as busy, a circuit is established to maintain relay 1739 in an actuated position. This circuit may be traced from grounded battery, through the left winding of relay 1739, right contacts of relay 1737, brush 1812 and its associated contact in position 1, brush 1821 and its associated contact in position 1 to ground at conductor 1860. In position 3 of sequence switch 1700, lamp 1410 is lighted to indicate that the sender is being tested to ascertain whether it is in a busy or idle condition. The circuit for lighting lamp 1410 may be traced from ground, through the right upper contact of cam 1714, lamp 1410, to grounded battery. Should this lamp remain lighted, a predetermined period of time, a time alarm circuit shown in Fig. 14 is actuated to operate an audible signal to indicate such condition to a test man. The detail operation of the time alarm circuit will be hereinafter described.

Assuming that an idle sender has been encountered, a circuit is not established through the left winding of relay 1739, and since the actuating circuit through the right winding of relay 1739 is opened by the rotation of sequence switch 1700 from position 1 to 3, this relay releases. The release of relay 1739 releases relay 1737.

The release of relay 1737 establishes a circuit to characterize the sender as busy to prevent a seizure by a district selector attempting to make a service connection. The establishment of this circuit also actuates apparatus in the sender to associate the register controlling circuit with the testing device. This circuit may be traced from ground through the right upper contact of cam 1717, right contacts of key 1433, right normal contacts of relay 1737, brush 1812 and its associated contact, brush 1821 and its associated contact, conductor 1860, Figs. 18 and 20, left outer contacts of relay 2057, winding of relay 2058 to grounded battery. Relay 2058 is operated in the circuit traced to establish a circuit for the rotation of the sequence switch shown in Fig. 24. This circuit may be traced from ground through the right normal contacts of relay 2059, left contacts of relay 2058, right outer normal contacts of relay 2051, right outer normal contacts of relay 2056, right upper contact of cam 2401, winding of sequence switch magnet 2400 to grounded battery. The sequence switch 2400 now rotates from position 1 to position 13. Upon its rotation into position 3, a circuit is established to operate relay 2051. This circuit may be traced from grounded battery, through the winding of relay 2051 to ground through the lower contact of cam 2410. The operation of relay 2051 completes the establishment of the dial pulsing circuit for setting the registers of the sender.

The release of relay 1737 further establishes a circuit to operate relays 1735 and 1736. This circuit may be traced from grounded battery, through the windings of relays 1735 and 1736 in parallel, left outer normal contacts of relay 1737, left contacts of key 1433, lower contact of cam 1703 to ground. The release of relay 1737 further establishes a circuit to rotate sequence switch 1700 from position 3 to position 4. This circuit may be traced from grounded battery, through the winding of magnet 1700, left upper contact of cam 1704, left inner normal contacts of relay 1737 to ground through the left outer normal contacts of relay 1733. Sequence switch 1700 now rotates from position 4 to position 6 under the control of its magnet contact and remains in position 6 during the test of the sender.

Upon the second rotation of sequence switch 1700 into position 2, a circuit is established to position the route control switch 1600. This circuit may be traced from grounded battery, through the winding of magnet 1600, right upper contact of cam 1602, brush 1813 and its associated contact, right normal contacts of relay 1732 to ground through the right upper contact of cam 1703. The setting of the route control switch determines the setting of the registers in the sender by positioning other sequence switches of the testing device as will be described hereinafter.

The operation of relays 1735 and 1736 as hereinbefore described associates conductors of the testing device with conductors extending to the sender. These conductors are maintained open until the sender is found to be in an idle condition, so that a sender, busy in service, will not be affected by association with the testing device.

The first operation in testing the sender is to simulate a subscriber's line with the receiver removed from the switchhook. This simulated subscriber's line is established over the dial pulsing circuit and may be traced from grounded battery through the left winding of pulsing relay 2050 shown in Fig. 20, left normal contacts of relay 1920, right inner contacts of relay 2051, conductor 1863, brush 1824 and its associated contact, brush 1815 and its associated contact, right contacts of relay 1736, right upper contacts of cam 1711, conductor 1763, lower contact of cam 1112, upper contact of cam 810, winding of relay 1121, right lower contact of cam 1113, left upper contact of cam 1710, left inner contacts of relay 1735, brush 1805 and its associated contact, brush 1823 and its associated contact, conductor 1862, left inner contacts of relay 2051, right normal contacts of relay 1920, left winding of balancing coil 2080 to ground. Relays 1121 and 2050 operate in the circuit traced. The operation of relay 2050 furnishes a preliminary pulse such as is sometimes occasioned by the false operation of the switchhook by a subscriber.

The operation of relay 1736 further establishes a circuit to position the route control switch 1650. This circuit may be traced from grounded battery, through the winding of magnet 1650, left upper contact of cam 1651, upper contact of key 1432, left contact of relay 1736, left upper and lower contacts of cam 1702, left inner contacts of start key 1750, left normal contacts of relay 1734, right outer normal contacts of relay 1733 to ground through the left outer normal contacts of relay 1732. The route control switch 1650 is thus rotated from position 1 to position 2. In position 2, circuits are established to position the testing circuit register switches to control the registers of the sender.

The register switches 650, 900, 915, 930, 945 and 960 are set in accordance with cross connection wiring between the terminals associated with the cams of each register switch and terminals 1675 and 1676 associated with the route control switch. The associated wiring between the register switch cams and the route control cams is used to operate the relays associated with the register switches when the register switches are positioned in accordance with the cam cutting associated with the route control switch in position 2. The operation of the relay associated with each register arrests the rotary movement of the register switch. All of the magnets controlling the rotation of the register switches are energized at one time. The circuit for operating these magnets may be traced from grounded battery, through the winding of magnet 650, left contacts of relay 658 to conductor 996, grounded battery, through the winding of magnet 900, left contacts of relay 906, to conductor 996, grounded battery through the winding of magnet 915, left contacts of relay 921 to conductor 996, grounded battery, through the winding of magnet 930, left contacts of relay 936, to conductor 996, grounded battery, through the winding of magnet 945, left contact of relay 951 to conductor 996 and grounded battery through the winding of magnet 960, left contacts of relay 966 to conductor 996, thence over conductor 996, upper contacts of cam 1108, right upper and lower contacts of cam 1715, left upper contact of cam 1659 to ground. Each register switch rotates until the associated relay is operated. The relay associated with each register switch operates as previously stated in accordance with the cross-connection to the route control cams. The circuit established to operate relay 658 may be traced from grounded battery, through the right lower contact of cam 816, left upper and lower contacts of cam 1716, right lower and left upper contacts of cam 1117, winding of relay 658, lower contact of cam 653, terminal 659, cross-connected to terminal 1675, right upper contact of cam 1664, to ground. It will be noted that this circuit is established in sequence switch positions 18½ to 1 and therefore the district brush register will be arrested in its rotary movement in position 1. The district group register 900 is arrested in its rotary movement in position 9, since the operating circuit for relay 906 is through the upper contact of cam 901, terminal 27 cross-connected to terminal 1676, right upper contact of cam 1667, to ground. The office brush register switch 915 is arrested in its rotary movement, in position 6 since the actuating circuit for relay 921 is through the lower contact of cam 916, terminal 28, cross-connected to terminal 1676, right lower contact of cam 1670, to ground. This particular cross-connection for the office brush register switch 915 is the skip office wiring and therefore, the office group register switch 930 is not set for this test. The code A register switch 945 is arrested in its rotary movement in position 3, since the operating circuit for relay 951 is through the upper contact of cam 949, terminal 97 cross-connected to terminal 1675, right upper contact of cam 1659, to ground. The code B register switch 960 is arrested in its rotary movement in position 5, since the actuating circuit for relay 966 is through the upper contact of cam 963, terminal 988 cross-connected to terminal 1675, right lower contact of cam 1662 to ground. When the office group register switch does not assume a setting to control the registers of the sender, a circuit is established to operate the office group relay 936 traced from ground through the right outer contacts of relay 921, upper contacts of cam 999, winding of relay 936, thence to grounded battery through the right lower contact of cam 816 as previously traced.

Upon the operation of the relays associated with the register switches, a circuit is established to rotate sequence switch 1100 from position 1 to position 2. This circuit may be traced from grounded battery, through the winding of sequence switch magnet 1100, right lower contact of cam 1102, normal contact of relay 1614, right outer contacts of relay 1121, right contacts of relays 966, 951, 936, 921, 906 and 658, upper contact of key 1432, left contacts of relay 1736, right upper and lower contacts of cam 1702, left inner contacts of key 1750, left normal contacts of relay 1734, right outer normal contacts of relay 1733, to ground through the left outer normal contact of relay 1732. Upon the rotation of sequence switch 1100, the dial pulsing circuit is opened at came 1113, to cause the release of relays 1121 and 2050, which were operated upon the establishment of this circuit. The release of relay 2050 completes the simulation of a preliminary pulse which sometimes occurs from accidental jarring of the switchhook preceding the operation of the dial by a subscriber.

In position 2 of control switch 1100, a circuit is established to rotate the numerical switch 1500 from position 1 to position 2. This circuit may be traced from grounded battery, through the winding of magnet 1500, left upper contact of cam 1501, right upper contact of cam 1654, to ground through the right upper contact of cam 1104. The numerical switch in position 2 establishes circuits to position the numerical register switches 975, 1200, 1230, 1250, and the station register switches 1270, 1300 and 1320.

For this test, the thousands numerical register switch 975 is rotated to position 5 by a circuit established from grounded battery, through the winding of magnet 975, upper contact of cam 977, left lower contact of cam 1504, right lower contact of cam 1508, right upper contact of cam 1564, to ground through the right upper contact of cam 1104. A circuit is established to energize the magnet of the hundreds register switch from grounded battery, through the windings of magnet 1200, left lower contact of cam 1201, left upper and right lower contacts of cam 1508, thence to ground at the right upper contact of cam 1104 as previously traced. The rotary movement of the hundreds numerical register is thus arrested in position 4. A circuit is established to rotate the tens numerical register switch from grounded battery, through the winding of magnet 1230, right upper contact of cam 1231, right lower contact of cam 1517, right lower contact of cam 1508 thence to ground at the right upper contact of cam 1104 as previously traced. The rotary movement of the tens numerical register switch is thus arrested in position 1. A circuit is established to rotate the units numerical register switch from grounded battery through the winding of magnet 1250, left upper contact of cam 1251, left lower contact of cam 1518, right lower contact of cam 1508 thence to ground at the right upper contact of cam 1104 as previously traced. The units numerical register switch is thus arrested in its rotary movement in position 5. A circuit to rotate the station hundreds register switch is established from grounded battery, through the winding of magnet 1270, right upper contact of cam 1271, right upper contact of cam 1519, right lower contact of cam 1508, thence to ground at the right upper contact of cam 1104 as previously traced. The station hundreds register switch is thus arrested in its rotary movement in position 7. A circuit is established to rotate the station tens register switch from grounded battery, through the winding of magnet 1300, upper contact of cam 1301, left lower contact of cam 1519, right lower contact of cam 1508, thence to ground at the right upper contact of cam 1104 as previously traced. The station tens register switch is thus arrested in position 10. A circuit is established to rotate the station units register switch from grounded battery, through the winding of magnet 1320, upper contact of cam 1321, left lower contact of cam 1516, right lower contact of cam 1508, thence to ground at the right upper contact of cam 1104 as previously traced. The station units register switch is thus arrested in position 10. The number used for this test is 4304—699 as indicated by a translation of the settings of the numerical switches as related to the pulsing interrupter 1000 or 1050.

The class register switch 610 and talking register switch 600 are set in a similar manner to the register switches previously described. A circuit is established to rotate the class switch from grounded battery, through the winding of magnet 610, left contacts of relay 631, lower contacts of cam 1108, lower contact of cam 1513, right lower contact of cam 1508, right upper contact of cam 1654 to ground through the right upper contact of cam 1104. The circuit established to rotate the talking register switch is from grounded battery, through the winding of magnet 600, left contacts of relay 607, and thence to ground over the circuit traced for actuating magnet 610. The operating circuit for class relay 631 extends from grounded battery, through the right lower contact of cam 816, left upper and lower contacts of cam 1716, right lower and left upper contacts of cam 1117, winding of relay 631, lower contact of cam 611, right lower contact of cam 612, right upper contact of cam 1516 to ground. It will be noted that relay 631 operates in position 18½ to 1 of the class register switch thus arresting the rotary movement of the switch in position 1. The operating circuit for talking register relay 607 extends from grounded battery the same as traced for relay 631 through the winding of relay 607, lower contact of cam 601, terminal strip 608, cross-connection to terminal strip 1523, right lower contact of cam 1511, right lower contact of cam 1508, and thence to ground at the right upper contact of cam 1104 as previously traced. It will be noted that the operating circuit for relay 607 is established in positions 18½ to 1 and thus the talking register switch is arrested in its rotary movement in position 1.

When the register switches have been arrested in their respective positions, a circuit is established to rotate the control switch 1100 from position 2 to position 3. This circuit may be traced from grounded battery, through the winding of magnet 1100, right upper contact of cam 1102, upper contacts of cams 1328, 1308, 1280, 1258, 1238, 1214 and 987, lower contact of cam 1522, right contacts of relay 631 to ground through the right contacts of relay 607. Control switch 1100 upon rotating from position 2 to 3 opens the actuating circuit for all of the register relays causing them to release.

During the rotation of control switch 1100 through position 2½, a circuit is established to operate relay 1126 from grounded battery, through the winding of relay 1126 to ground through the left lower contact of cam 1103. Relay 1126 in operating, establishes a locking circuit for itself from grounded battery through its winding, left inner contacts, right middle normal contacts of relay 1120, left lower contact of cam 1051, to ground through the left upper contact of cam 1703. A further circuit is established in position 3 of the control switch 1100 to actuate the magnet of the impulse switch 400. This circuit may be traced from grounded battery, through the winding of magnet 400, right upper contact of cam 411 to ground through the left upper contact of cam 1104. The impulse switch (Fig. 4) is thus rotated from position 1 to position 2.

As brought out in the general description, switches 1000 and 1050 are used as pulsing interrupters and are driven by special means to accurately control the number of revolutions per minute. Switch 1000 is a slow speed interrupter used to simulate slow dial pulses with each pulse of equal time duration. Switch 1050 is a high speed interrupter to simulate fast dial pulses, each pulse of equal time duration. Since relay 1120 is in its normal position, the high speed interrupter is used for this test.

The operation of relay 1126 establishes a circuit to rotate the high speed interrupter 1050 out of position 1. This circuit may be traced from grounded battery, through the winding of magnet 1050, lower contact of cam 1052, right inner normal contacts of relay 1120, right contacts of relay 1126, left lower contact of cam 1111, left upper and lower contacts of cam 614 to ground. The high speed interrupter 1050 now makes a complete revolution under the control of its magnet contact, and the pulses dialed by said interrupter are in accordance with the setting of the register switches. It will be noted that cam 1053 is arranged to send ten pulses into the sender. This number, however, is diminished in accordance with the segments of the interrupter short circuited by the register switch. The utility of interrupter 1050 in conjunction with the register switches for setting the registers of the sender will be hereinafter described in detail. In position 3 of the control switch 1100, the dial pulsing circuit is established. This circuit may be traced from grounded battery, through the left winding of pulsing relay 2050, left normal contacts of relay 1920, right inner contacts of relay 2051, conductor 1863, brush 1824 and its associated contact, brush 1815 and its associated contact, right contact of relay 1736, right upper contact of cam 1711, conductor 1763, left upper contact of cam 1112, lower contact of cam 1653, contacts of key 1682, left normal contacts of relay 1120, lower contact of cam 1053, lower contacts of cam 1652, contacts of key 1682, upper contact of cam 1113, left upper contact of cam 1710, left inner contacts of relay 1735, brush 1805 and its associated contact, brush 1823 and its associated contact, conductor 1862, left inner contacts of relay 2051, right contacts of relay 1920, left winding of balancing coil 2080 to ground. The part of this fundamental circuit traced through the sender testing device simulates a subscriber's line with two bridged subscribers' sets and a 10,000 ohm leak to represent the most severe line conditions over which dialing pulses must be recorded.

It is thought that the invention will be better understood from a consideration of the manner in which the registers of the sender are set upon each operation of the interrupter switch 1050 or 1000 in conjunction with the various register switches shown in Figs. 6, 9, 10, 12 and 13. The general operation of the sender and setting of the switches is in accordance with the following description. A detailed description of the sender will not be made since it is functionally the same as that disclosed in the application to A. E. Lundell, Serial No. 487,520, filed July 26, 1921.

Assuming that the switches of the sender circuit (Figs. 19, 20, 21, 23, 24 and 25) are in their normal positions, relays 2058 and 2060 are operated upon its seizure by the testing device, as previously described. It will be remembered that a ground is associated with lead 1860 by the testing device and the circuit for operating relay 2058 may be traced from this ground over conductor 1860, left normal contact of relay 2057, winding of relay 2058 to grounded battery. The operation of relay 2058 establishes an obvious circuit to operate relay 2060. The operation of relay 2058 establishes a locking circuit for itself through the upper contacts of cam 2071. Also, a circuit is established to rotate sequence switch 2400 out of position 1. This circuit may be traced from grounded battery through the winding of magnet 2400, right upper contact of cam 2401, right outer normal contact of relay 2056, right outer normal contacts of relay 2051, left contacts of relay 2058 to ground through the normal contacts of relay 2059. Sequence switch 2400 rotates from position 1 to position 2 under the control of the circuit traced and from position 2 to position 3 under the control of the magnet contact. Upon its rotation into position 3, a circuit is established to operate relay 2051. This circuit may be traced from grounded battery through the winding of relay 2051 to ground through the lower contact of cam 2410. Relay 2051 in operating opens the energizing circuit for magnet 2400 and establishes a locking circuit for itself through its left outer contacts to ground through the left contacts of relay 2060. A further circuit is established by the operation of relay 2051 to rotate sequence switch 2000 from position 1 to position 2. This circuit may be traced from grounded battery through the winding of magnet 2000, left upper contact of cam 2001, right outer contacts of relay 2051, left contacts of relay 2058 to ground through the contacts of relay 2059. Sequence switch 2000 now rotates to position 3 under the control of the magnet contact. The operation of relay 2051 further establishes the dial pulsing circuit between the testing device and the sender. As previously described, a subscriber's line is simulated in the testing device. This subscriber's line is associated with conductors 1862 and 1863 to operate relay 2050, as previously described. The operation of relay 2050 establishes an obvious circuit through the left winding of relay 2061 to cause its operation. The operation of relay 2061 establishes an obvious circuit to operate relay 2062. The operation of relay 2062 establishes a circuit to operate relay 2163 from grounded battery through its winding, brush 2105 and its associated normal contact to ground through right inner contacts of relay 2062. Relay 2163 is associated with the alarm circuit arranged to signal a trouble condition.

The operation of interrupter switch 1050 in the testing device simulates dial pulses to alternately release and reoperate relay 2050. Relay 2061 is slow to release and remains operated during the pulsing period for each digit dialed. The first release of relay 2050 establishes a circuit from battery through the winding of relay 2164, winding of register magnet 2110, left normal contacts of relay 2165, brush 2103 and its associated normal terminal, left outer contacts of relay 2062 to ground through the contacts of relay 2050. Relay 2164 and register magnet 2110 are operated in the circuit traced. The release of relay 2050 further establishes a circuit from grounded battery through the winding of relay 2166, right contacts of relay 2165, brush 2104 and its associated normal terminal, contacts of register magnet 2110, and thence to ground at the contacts of relay 2050, as previously traced. The operation of relay 2164 is used in ordinary service to remove the dial tone from the subscriber's line. Upon the second operation of relay 2050 the energizing circuit for magnet 2110 is opened to cause the register brush assembly to step from its normal terminal to position 1. In this manner the register magnet 2110 is operated and released to rotate the brush assembly to a position representing the first digit of the office code. Relay 2166 operates over the circuit previously traced to prolong the establishment of the circuit to operate the register magnet 2110 and to maintain the holding circuit for relay 2061.

Upon the completion of the first series of dial pulses, relay 2164 releases. The release of this relay establishes an operating circuit for relay 2167. This circuit may be traced from grounded battery through the winding of relay 2164, winding and contacts of register switch magnet 2110, in multiple with grounded battery through the winding of relay 2166 traced through the right contacts of relay 2165, brush 2104 and its associated normal terminal to a junction point, thence through brush 2111 and its associated contact, brushes 2301, 2312, 2501, 2511, 2521, 2531, 2541, 2551 and their associated contacts in normal position, left normal contacts of relay 2170, winding of relay 2167 to ground at the right contacts of relay 2164. Relay 2164 and 2166 and register magnet 2110 are not energized in the circuit traced on account of the high resistance winding of relay 2167. Relay 2167, however, operates to establish a circuit for energizing the magnet of register 2100. This circuit may be traced from battery through the winding and contact of register magnet 2100, left contacts of relay 2164, brush 2101 and its associated normal contact to ground through the right contacts of relay 2167. The register magnet 2100 is energized in the circuit traced to rotate the brush assembly from normal to position 1. The rotation of the register switch 2100 from normal to position 1 opens the energizing circuit for relay 2163 to cause its release.

The sender is now prepared to receive the pulses for the second digit of the office code, which will be referred to as the B code. Relay 2050 again responds to a second rotation of the interrupter switch 1050 in the testing device to position the register 2300 in a manner similar to that described for positioning the A register 2110 with the exception that the pulsing circuit is traced through the winding of the B register magnet 2300 and brush 2103, now resting in position 1. The B register 2300 now steps its brush assembly one step for each release of relay 2050, as described for the A register 2110, positioning its brushes in accordance with the number of pulses transmitted. Upon the completion of the pulses to set the B register, relay 2167 is again operated in the manner described upon the completion of the first series of pulses from setting the A register. The operation of relay 2167 energizes magnet 2100 in the manner previously described to advance the brush assembly of register switch 2100 to position 2. The register control switch 2100 is now in position to direct the next series of impulses from relay 2050, as controlled by the testing device, to position the thousands register 2310. The thousands register 2310, hundreds register 2500, tens register 2510, units register 2520, stations hundreds register 2530, stations tens register 2540 and stations units register 2550 are each set in a similar manner to that described for the A and B registers 2110 and 2300. The register control switch 2100 is advanced one position, as previously described, upon each setting of the register.

The power driven translator is shown in schematic form, as indicated by switch assemblies 2340, 2350 and 2360 to 2369, inclusive, and the control of the translator takes place as soon as the register control switch 2100 has stepped to position 2. When the register control switch is thus positioned, a circuit is established to operate relay 2168 from grounded battery through resistance 2181, winding of relay 2168, brush 2105 and its associated contact in position 2 to ground through the right inner contacts of relay 2062. Relay 2168 in attracting its right armature establishes a locking circuit for itself to ground through the left contacts of relay 2167. The operation of relay 2168 further establishes a circuit to energize the magnet 2330 of the translator to control its rotary movement. The operation of relay 2168 further associates a ground with the translator hunting brush 2340 or 2350 so that, when such brush assembly is positioned in accordance with the setting for the particular connection, its ground is extended to the stop magnet 2331.

The energizing circuit for relay 2333 is controlled by the position of brush 2112 of the A code register 2110. This description will assume relay 2333 as normal. The energizing circuit for the rotary control magnet 2330 may be traced from grounded battery through the winding of magnet 2330, contact of the stop magnet 2331 to ground at the left inner contacts of relay 2168. The energizing circuit for stop magnet 2331 may be traced from grounded battery through resistance 2332, winding of stop magnet 2331, brush 2113 and its associated contact, one of brushes 2303 to 2306, respectively, depending upon the position of brush 2113, associated contacts of brushes 2303 to 2306, brush 2340 and its associated contact, contacts of relay 2333 to ground through the left inner contacts of relay 2168. Relay 2171 is operated in parallel with the stop magnet 2331 from battery through its winding, brush 2113 and its associated contact, one of brushes 2303 to 2306 and its associated contact, brush 2340 and its associated contact to ground through the left inner contacts of relay 2168. The setting of the translator is controlled by the setting of the code A and code B register switches 2110 and 2300, to control the positioning of the district and office selectors for brush and group selection.

The operation of relay 2171 in multiple with the stop magnet 2331 establishes a circuit to rotate the sequence switch 2000. This circuit may be traced from grounded battery through the winding of sequence switch magnet 2000, right upper contact of cam 2001, left contacts of relay 2054 to ground through the right contacts of relay 2171. The sequence switch 2000 now rotates under the control of the circuit traced to position 6¾ where a circuit is established to operate relay 2054, which opens the energizing circuit for sequence switch magnet 2000. The operating circuit for relay 2054 may be traced from grounded battery through its winding, left lower and upper contacts of cam 2002, brush 2368 and its associated contact to ground through the left contacts of relay 2171. Relay 2054 in attracting its right inner armature establishes a locking circuit for itself to ground through the right upper contact of cam 2003. The energizing circuit for sequence switch magnet 2000 is opened at the left contacts of relay 2054, arresting the rotary movement of the sequence switch in position 7. The operation of relay 2054 further establishes a circuit to rotate the sequence switch (Fig. 22) from position 1 to position 2. This circuit may be traced from grounded battery through the winding of magnet 2200, left upper contact of cam 2202, left contacts of relay 2054 to ground through the right contacts of relay 2171.

The sender selector is now positioned to control the district brush selection. Since the district under test is associated with the testing device herein disclosed, the recording of district brush selection is made by the testing device. This phase of the description will be taken in order and the sender will be herein described as associated with a district selector.

With the sequence switch (Fig. 22) in position 2, the fundamental circuit is established to control district brush selection in accordance with the setting of the translator switches. This fundamental circuit may be traced from conductor 1864 through the right outer normal contacts of relay 2053, upper contact of cam 2020, right inner normal contacts of relay 2250, upper contact of cam 2220, winding of stepping relay 2260, contacts of the BO counting relay 2251, left inner normal contacts of relay 2252, upper contact of cam 2219 to ground. When the sender is associated with a district in service, the stepping relay 2260 is operated and released by the upward movement of the elevator switch brushes in contact with the commutator segments to cause the stepping relay to intermittently operate and release. Upon each operation and release of the stepping relay 2260 one set of counting relays is operated and locked. The required number of counting relays to be operated for a given selection is determined by the association of certain counting relays with the terminals of the translator switch. This association is variable and may be of any combination to properly control selections. The circuit for operating the counting relays during district brush selection may be traced from ground through the contacts of stepping relay 2260, left outer normal contacts of relay 2256, left inner normal contacts of relay 2253, right inner normal contacts of relay 2252, left upper contact of cam 2207, left upper contact of cam 2208, lower contact of cam 2023, which is part of the sequence switch shown in Fig. 20, brush 2365 and its associated contact, which it will be assumed is connected to the No. 2 counting relay, winding of the No. 2 counting relay to grounded battery, operating the No. 2 counting relay. The operation of the No. 2 counting relay establishes a locking circuit for itself and an operating circuit for the No. 2' counting relay, which is effective upon the release of stepping relay 2260. The operating circuit for the No. 2 counting relay establishes a shunt circuit for the No. 2' counting relay, which is opened upon release of stepping relay 2260. Subsequent energizations and deenergizations of the stepping relay 2260 operate the Nos. 1, 1', O, FO and BO counting relays. The operation of the BO counting relay opens the fundamental circuit to arrest the upward movement of the district selector switch elevator. The operation of the FO counting relay establishes a circuit to rotate the sequence switch from position 2 to position 4. This circuit may be traced from grounded battery through the winding of magnet 2200, left upper contact of cam 2201, left outer normal contacts of relay 2254, right inner normal contacts of relay 2253 to ground through the contacts of the FO counting relay.

In sequence switch position 4 the fundamental circuit is again established through the stepping relay 2260 and the translator switches are associated with the counting relays for district group selection.

It will be noted that in position 2 of the sequence switch (Fig. 22) a circuit is established to operate relay 2056 from grounded battery through its left winding, right upper contact of cam 2209, left outer contacts of relay 2252, left inner contacts of relay 2052, conductor 1865 to a ground associated with the lower contacts of cam 809 (Fig. 8). Upon the completion of group selection, a number of the counting relays are operated in accordance with the wiring for such operation including counting relays O, FO and BO. The operation of the BO counting relay opens the fundamental circuit to arrest the upward movement of the district switch elevator. When operated in conjuction with the testing device, the BO counting relay opens the fundamental circuit to act as a check in the recording and pulsing system. It may be stated at this time that the checking circuit of the pulsing system, shown in Fig. 3, advances switches in the testing device to remove the ground from conductor 1865, causing relay 2056 to release. The release of relay 2056 establishes a circuit to rotate the sequence switch (Fig. 22) out of position 4. This circuit may be traced from grounded battery through the winding of magnet 2200, left outer contact of relay 2056, left upper and right lower contacts of cam 2210, left outer normal contacts of relay 2254, right inner normal contacts of relay 2253 to ground through the contacts of the FO counting relay. The sequence switch rotates from position 4 to position 5 under the control of the circuit traced and from position 5 to position 6 under the control of the magnet contact.

Let it be assumed that an office selector is required for the completion of a call. With the sequence switch (Fig. 22) in position 6, the fundamental circuit is closed for office brush selection, operating the stepping relay 2260 in the manner previously described. A number of the counting relays shown in Fig. 22 will be operated in accordance with the number required for office brush selection. The operating circuit is the same as that described for district brush selection except that brush 2365 in the translator is associated with the operating circuit for the counting relays. Upon the operation of the BO counting relay, the fundamental circuit is opened, arresting the upward movement of the office switch elevator. The operation of the FO counting relay establishes a circuit to rotate the sequence switch (Fig. 22) from position 6 to position 8 in the manner previously described.

The office group selection is made in position 8 of the sequence switch in the same manner as that described for district group selection with the exception that the counting relays are associated with the translator switch brush 2360 instead of brush 2364. Upon the operation of the counting relays for office group selection the BO counting relay opens the fundamental circuit to arrest the upward movement of the office switch elevator. The operation of the FO counting relay establishes a circuit to rotate the sequence switch (Fig. 22) from position 8 to position 10. As the sequence switch (Fig. 22) enters position 9¾, the trunk guard relay 2070 is bridged across the conductors from the testing device. The testing device in this test represents the incoming selector switch. Grounded battery from the testing device is connected to conductor 1864 and the operating circuit for relay 2070 may be traced from conductor 1864 through the right outer normal contacts of relay 2053, resistance 2072, left upper contact of cam 2004, winding of relay 2070, left upper contact of cam 2209, left outer contacts of relay 2252, right inner contacts of relay 2052, conductor 1865, thence to ground through the testing device. Relay 2070 operates in the circuit traced to operate relay 2071. Relay 2070 is fast-operating to respond quickly in circuit with the incoming selector switch or testing device and relay 2071 is slow to release in order to allow sufficient time for the functioning of apparatus in the sender circuit. The operation of relay 2071 establishes a circuit from ground through its contact, winding of relay 2255 to grounded battery, operating relay 2255. A locking circuit is established for relay 2255 from grounded battery through its winding and right inner contacts, right upper and lower contacts of cam 2005, left lower contact of cam 2211 to ground. The operation of relay 2255 establishes a circuit to rotate the sequence switch (Fig. 22) from position 10 to position 12. This circuit may be traced from grounded battery through the winding of magnet 2200, upper contacts of cam 2006, lower contact of cam 2212, left outer contact of relay 2255 to ground through the left upper contact of cam 2003. The rotation of the sequence switch opens the holding circuit for relay 2255 to cause its release.

The incoming brush selection is made in position 12 of the sequence switch in accordance with the position of the thousands register 2310. The fundamental circuit is established in position 12 and the stepping relay 2260 again intermittently operated and released to set the counting relays in accordance with the aforesaid setting of the thousands register 2310. Upon the completion of incoming brush selection the sequence switch (Fig. 22) is rotated from position 12 to position 14 when the FO counting relay is operated. The circuit for energizing the sequence switch magnet 2200 is the same as previously traced.

In coming group selection is accomplished by the combined setting of the thousands register 2310 and the hundreds register 2500. It will be noted that the counting relays for incoming group selection are associated with the contacts of relay 2560. With relay 2560 normal, either the 0 or 2 counting relay is actuated upon the first operation of the stepping relay 2260 in accordance with the position of the thousands register 2310. Relay 2560 is energized in certain positions of the hundreds register 2500. Under this condition, the 1 or 3 counting relay is operated upon the first actuation of the stepping relay 2260 in accordance with the position of the thousands register 2310. Upon the completion of incoming group selection the sequence switch (Fig. 22) is rotated from position 14 to position 16, when the FO counting relay is operated. The energizing circuit for the sequence switch magnet 2200 is the same as previously traced.

The sequence switch (Fig. 22) is now positioned for final brush selection, which is made through the hundreds register switch 2500. The operation is the same as described for incoming brush selection and at the completion of the control of the final selector switch for brush selection the sequence switch (Fig. 22) is rotated to position 18.

Final tens selection is now made through the contacts of the tens register switch 2510 in a similar manner to the selections previously described. Upon the completion of final tens selection the FO counting relay operates in the manner previously described. This operation, however, establishes a circuit to operate relays 2254 and 2252 from battery through their windings in series right lower and upper contacts of cam 2205, right inner normal contacts of relay 2253 to ground through the contacts of the FO counting relay. Relay 2254 in attracting its left inner contacts establishes a locking circuit for both relays to ground through the left upper contact of cam 2203. The operation of relay 2252 establishes a circuit to operate relay 2250 and 2257 from grounded battery through the windings of both relays in series to ground through the right outer contacts of relay 2252. The operation of relay 2254 transfers the actuating circuit for magnet 2200 from the left upper contact of cam 2201 to the right upper contact of cam 2201. The remaining circuits established by the operation of relays 2252, 2254, 2250 and 2257 establish transfers of conductors to arrange the circuit for a second rotation of the sequence switch (Fig. 22) or final units, station hundreds, station tens and station units selection. A circuit is established through the contacts of relay 2257 to rotate the sequence switch from position 18 to position 2. This circuit may be traced from grounded battery through the winding of magnet 2200, lower contact of cam 2201, right contacts of relay 2257, to ground through the left upper contact of cam 2206. In position 2 of the sequence switch (Fig. 22) final units selection is made in the same manner as previously described with the exception that the circuit paths are through the contacts of the relays operated in position 18 of the sequence switch.

The stations registers are used for calls to other offices than the office in which the call is initiated. The routing through the stations registers and the operation of counting relays is made in positions 4, 6 and 8 of the sequence switch only (Fig. 22) in a similar manner to that already described for the operation and setting of the incoming and final switches. Upon the completion of station units selection the sequence switch (Fig. 22) is advanced to position 10 through the operation of the FO counting relay.

As described in detail in the application to A. E. Lundell, Serial No. 487,520, filed July 26, 1921, the incoming selector switch remains in a certain position called "selection beyond" until the selections of the automatic switches have been made. Upon the completion of such selections the incoming selector switch is rotated out of the "selection beyond" position. In position 10 of the second revolution of the sequence switch (Fig. 22) the fundamental circuit is established to the incoming selector switch apparatus over conductors 1864 and 1865. The fundamental circuit is now extended to the windings of relays 2260 and 2261 of the sender circuit, operating both relays. This circuit may be traced from conductor 1865, right inner contacts of relay 2052, left upper and right lower contacts of cam 2206, left inner contacts of relay 2252, contact of the BO counting relay 2251, winding of relay 2260, right lower contact of cam 2213, left outer contacts of relay 2250, left winding of relay 2261, upper contact of cam 2020, left outer normal contacts of relay 2053, to conductor 1864. Relay 2261 in operating establishes a locking circuit from grounded battery through its right winding and contacts to ground through the right lower contact of cam 2206. The operation of relay 2261 further establishes a circuit to operate relay 2253 from grounded battery through its winding, left inner contacts of relay 2257, contacts of relay 2261 to ground through the right lower contact of cam 2206. The operation of relay 2253 establishes a circuit to operate the O counting relay from the grounded battery through the winding of the O counting relay, left inner contacts of relay 2253, left outer normal contacts of relay 2256, contacts of stepping relay 2260 to ground. The movement of the incoming selector sequence switch opens the fundamental circuit, releasing the stepping relay 2260. Upon the release of the stepping relay, the FO and BO counting relays operate. The operation of the BO counting relays holds the fundamental circuit open and the operation of the FO counting relay establishes a circuit to operate relays 2052 and 2053. This circuit may be traced from ground through the contacts of the FO counting relay, right inner contacts of relay 2253, left normal contacts of relay 2258, winding of relay 2053 to grounded battery in multiple with the winding of relay 2052 to grounded battery. The operation of relay 2053 establishes a locking circuit for both relays through the right inner contacts of relay 2053 to ground through the left upper contact of cam 2003. The operation of relay 2053 establishes circuits to advance the selector switches. The advance of the selector switches opens the dialing circuit to release relays 2050, 2061 and 2062. The release of relays 2062 and 2050 establishes an energizing circuit for relay 2073 from grounded battery through its winding, left upper and lower contacts of cam 2007, left outer contacts of relay 2062 to ground through the contacts of relay 2050. The operation of relay 2073 establishes a circuit to rotate the sequence switch (Fig. 22) from position 10 to position 12. This circuit may be traced from grounded battery through the winding of magnet 2200, right upper contact of relay 2201, left outer contacts of relay 2254, right outer contacts of relay 2253, right outer contacts of relay 2052 to ground through the left contacts of relay 2073.

In position 12 of the sequence switch (Fig. 22) talking selection is made by again establishing the fundamental circuit when operating the stepping relay 2260. The operation of relay 2260 establishes a circuit to operate the O counting relay, as previously traced. As the district selector advances to talking position, ground is connected to the tip side of the fundamental circuit to release the stepping relay 2060. The release of relay 2060 removes the shunt ground from the FO and BO counting relays to allow them to operate over the circuit established by the operation of the O counting relay. The operation of the BO counting relay opens the fundamental circuit to release a relay in the district, thus arresting the district selector in the proper talking position for the class of call indicated by the position of the registers.

In view of the reference to the patent application to A. E. Lundell, Serial No. 487,520, filed July 26, 1921, in this specification, it is thought unnecessary to give further detailed information of the sender operation. The testing device will therefore be described in accordance with its relation to the functioning of the sender.

The pulsing interrupters 1000 and 1050 shown in Fig. 10 are designed to simulate dial pulses from a subscriber's station. Interrupter 1000 simulates slow dial pulses and interrupter 1050 simulates fast dial pulses. The interruptions of subscriber's station dials for operating pulsing relay of a sender are not always uniform. The type of dial used in conjunction with the telephone system herein disclosed employs a governor to regulate the uniformity of interruptions upon each rotation. These parts, however, are subject to wear and abuse sufficient to change the speed of each rotation and thus change the speed of the interruptions. The dial is spring driven, and therefore even though a governor is used to regulate the speed, a slight difference is noted between the first and last pulses of one rotation of the dial. The slow and fast interrupters 1000 and 1050 simulate the extreme variations in the speed of dial interruptions to test the response of the pulsing relay 2050 in the sender circuit.

The actuation of relay 1120 associates the slow interrupter 1000 with the apparatus of the testing device. This relay is actuated by a key or automatically operated during certain ones of the automatic routine tests. The normal position of relay 1120 associates the testing device with the high speed interrupter. The circuit operation will be described as associated with the high speed interrupter 1050.

One register of the sender is positioned upon each rotation of the interrupter 1050. The number of pulses transmitted to each register is automatically regulated by the position of each register switch in the testing device. It will be remembered that the register switches of the testing device are positioned as follows: register switch 945, code A, position 3; register switch 960, code B, position 5; register switch 975, thousands, position 5; register switch 1200, hundreds, position 4; register switch 1230, tens, position 1; register switch 1250, units, position 5; register switch 1270, station hundreds, position 7; register switch 1300, station tens, position 10; register switch 1320, station units, position 10. The code A and the code B registers of the sender are set to regulate the district brush, district group, office brush and office group selections through the positioning of the translator. The thousands, hundreds, tens and units register switches are set to control the pulses in such manner that No. 4304 is transmitted to the corresponding registers of the sender. The station hundreds, tens and units register switches are set to transmit No. 699 to the registers of the sender.

It will be remembered from the previous description that interrupter 1050 was rotated upon the actuation of relay 1126, and that relay 1126 is actuated upon the rotation of the sequence switch (Fig. 11) through position 2½ during its rotation from position 2 to position 3. The actuation of relay 1126 establishes a circuit to energize the magnet of interrupter 1050 to rotate it out of position 1. This circuit may be traced from grounded battery through the winding of magnet 1050, lower contact of cam 1052, left inner normal contacts of relay 1120, right contacts of relay 1126, left lower contact of cam 1111, left upper normal contact of cam 6614 to ground. Relay 1126 establishes a locking circuit for itself through its left inner contacts, right middle contacts of relay 1120, left lower contact of cam 1051 to ground through the left upper contact of cam 1703. The high speed interrupter now rotates one complete cycle to set the A code register 2110 in the sender, in accordance with the setting of the register switch 945. Cam 1053 is cut with ten equal openings or insulated segments so that upon each revolution its circuit, with the lower contact associated with the cam, is broken ten times. It will be remembered that the tip conductor of the pulsing circuit is connected to the contact associated with cam 1053 and that the ring conductor of the pulsing circuit is connected to the cam. The number of pulses transmitted over the pulsing circuit is governed by the number of of insulated portions of cam 1053 that are short circuited by cams of the register switches. It will be remembered that the code A register 945 is resting in position 3 and therefore the circuit for reducing the number of pulses may be traced from the tip conductor of the pulsing circuit through the right upper contact of cam 1116, right lower contact of cam 958, upper contact of of cam 1055 to the ring conductor of the pulsing circuit. Since the upper contact of cam 1055 is closed from position 4¾ to 18, the pulsing circuit will be opened in position 3 and position 4 to release the pulsing relay each time the fundamental circuit is opened, each release of the pulsing relay advances the code A register switch 2110 one position.

When interrupter 1050 is rotated to position 3, the locking circuit for relay 1126 is opened to cause its release. Upon the completion of pulses, the interrupter 1050 rotates to position 13 to establish a circuit to rotate the sequence switch (Fig. 11) from position 3 to position 4. This circuit may be traced from grounded battery through the winding of magnet 1100, left lower contact of cam 1102, left outer normal contacts of relay 1126, right outer normal contacts of relay 1120, right lower contact of cam 1051 to ground through the left upper contact of cam 1703. During the rotation of the sequence switch through positions 3½, the circuit is again established to actuate relay 1126. The locking circuit for relay 1126 is also established, as previously traced.

The pulses are now transmitted to the pulsing relay 2050 to set the B code register 2300 in accordance with the setting of the B code register switch 960. This is accomplished in the manner described for setting the A code register with the exception that the short circuit for reducing the number of pulses is traced from the tip conductor of the pulsing circuit at the contact of cam 1053 through the lower contact of cam 1116, left upper contact of cam 973, lower contact of cam 1057 to the ring conductor of the pulsing circuit at cam 1053.

The numerical pulses are transmitted to the pulsing relay through the contacts of the interrupter 1050 in accordance with the settings of register switches 975, 1200, 1230, 1250 and the station pulses in accordance with the settings of registers 1270, 1300 and 1320 in the manner described for the A and B code register pulses. Upon the completion of each set of pulses the control switch 1100 is rotated one position. During the rotation from position to position, relay 1126 is operated to again rotate the interrupter. In this manner the control switch 1100 is rotated to position 11 for the station units selection in accordance with the setting of register switch 1320, and upon the transmission of the pulses for setting the station units register 2550 in the sender, the control switch is rotated to position 12.

A circuit is established in positions 11 and 12 of the control switch, Fig. 11, to operate relay 1680, shown in Fig. 16. This circuit may be traced from grounded battery through the winding of relay 1680, contacts 1462 of key 1430 to ground through the right lower contact of cam 1103. The operation of relay 1680 establishes a locking circuit for itself through its right inner contacts to ground through the right lower contact of cam 1667. The operation of relay 1680 further establishes a circuit to rotate the sequence switch, Fig. 11, from position 12 to position 13. This circuit may be traced from grounded battery through the winding of magnet 1100, left upper contact of cam 1102, right outer contacts of relay 1680 to ground through the lower contact of cam 1658. Upon the rotation of the sequence switch from position 12 to position 13 a circuit is established to rotate it to position 14. This circuit may be traced from grounded battery through the winding of magnet 1100, left lower contact of cam 1101 to ground through the left upper contact of cam 418.

When the registers of the sender are set, the apparatus in the sender functions as previously described to interpret the setting of the registers into the control of selector switches. The attempted control of the selector switches is recorded and tested by the testing device. As previously described, the fundamental circuit for controlling the selector switches is established over conductors 1864 and 1865 to operate stepping relay 2260, which in turn operates the number of counting relays corresponding to the association of said counting relays with the register controlling each particular selection. This fundamental circuit may be traced from grounded battery through the winding of relay 303, contacts of the No. 10′ counting relay, left normal contacts of relay 307, left normal contacts of relay 308, lower contact of cam 405, upper contact of cam 805, lower and upper contacts of cam 1105, conductor 1764, right inner contacts of relay 1735, brush 1806 and its associated contact, brush 1825 and its associated contact, conductor 1864, right outer contacts of relay 2053, upper contact of cam 2020, right inner normal contact of relay 2250, upper contact of cam 2220, winding of stepping relay 2260, contact of relay 2251, left inner contacts of relay 2252 to ground through the upper contact of cam 2219. Relays 2260 and 303 operate in the circuit traced. Relay 303 establishes a locking circuit for itself from grounded battery through its winding, contacts of the No. 10 counting relay, right outer contacts of relay 303, and thence over the fundamental circuit as previously traced to ground through the upper contact of cam 2214.

The operation of relay 303 further establishes a circuit to operate relay 307. This circuit may be traced from grounded battery through the left winding of relay 307, left lower contact of cam 415 to ground through the right inner contacts of relay 303. Relay 831 is operated in multiple with relay 307. This circuit may be traced from grounded battery through the winding of relay 831 to ground through the right inner contacts of relay 303. Relay 307 in operating establishes a locking circuit for itself from grounded battery through its right winding and right contacts to ground through the lower contact of cam 418. The operation of relay 831 opens the operating circuit for relay 830 to prevent its operation until the sequence switch 800 and other auxiliary circuits are properly positioned.

Figure 22:
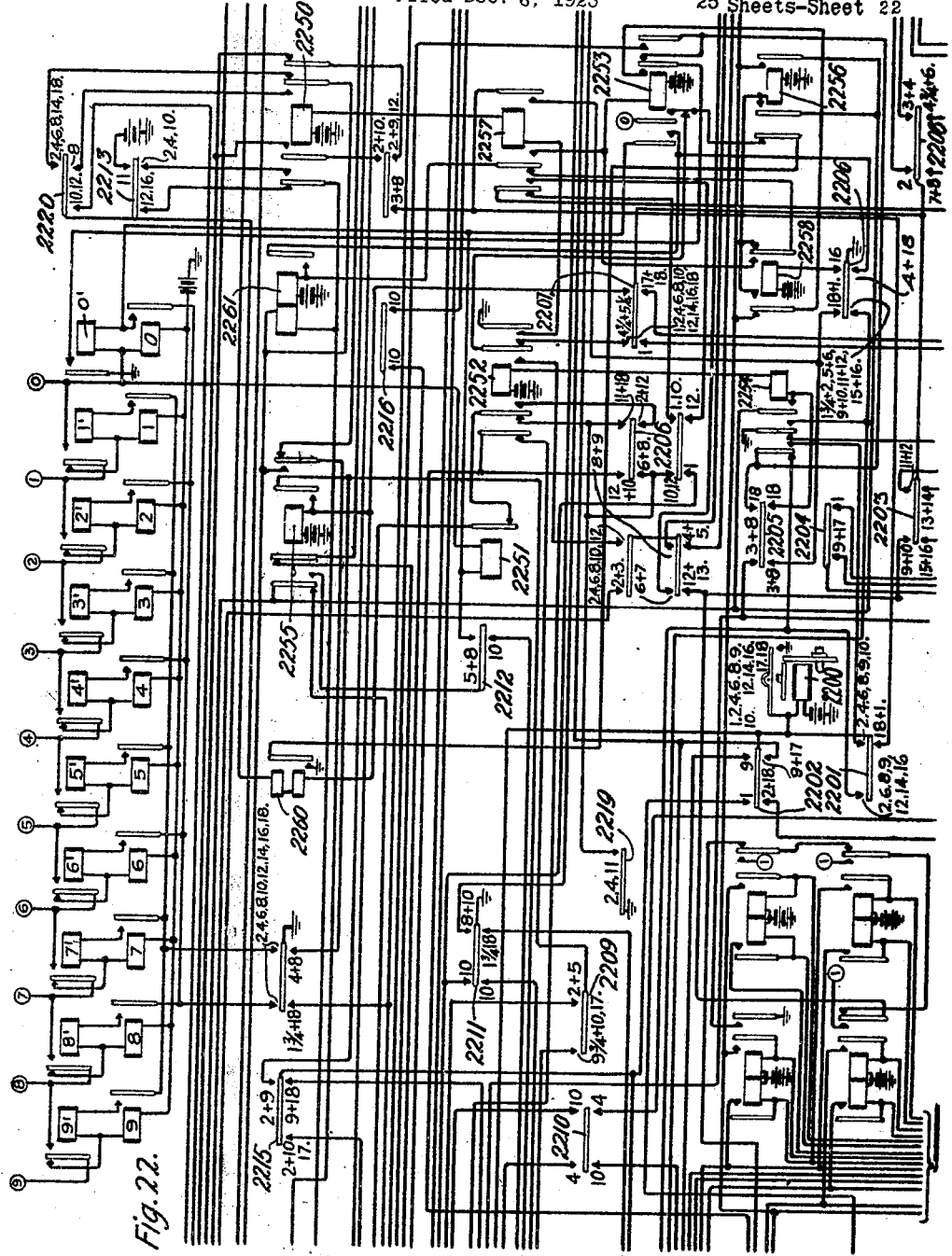

A circuit is established through the contacts of relay 303 to associate interrupter 302 with the counting relays shown in Fig. 3. Interrupter 303 simulates the commutator of the various selector switches ordinarily controlled by the sender circuit. The initial rotation of interrupter 302 after the operation of relay 303 establishes a circuit to operate relay 305 from ground through the upper-interrupter contact, right middle contacts of relay 305, normal contacts of relay 306, winding of relay 305, upper contact of cam 408, upper contact of cam 814 to grounded battery. It will be noted that the operation of relay 305 establishes circuits to operate relays 304 and 306. They are, however, prevented from operating by the shunt from interrupter 302. The operating circuit for relays 304 and 306 may be traced from the source of battery current for operating relay 305 through the winding of relay 305, windings of relay 304 and 306 in multiple, contacts of relay 305, lower contact of cam 409 to ground through the lower contact of cam 811. Upon further rotation of interrupter 302 the shunt is removed from the operating circuit for relays 304 and 306 to cause their operation. The second rotation of interrupter 302 establishes two circuits, one through its upper contact to operate the O counting relay and a second through its lower contact to shunt the stepping relay 2260 to cause its release. The shunt circuit may be traced from ground through the lower contact of interrupter 302, contacts of relay 304, outer contacts of relay 303 to a junction point in the fundamental circuit simulating the shunt established by a commutator of a selector switch upon the upward movement of its elevator. The circuit for operating the O counting relay may be traced from ground through the upper contact of interrupter 302, middle contacts of relay 303, contacts of relay 306, normal contacts of the O' counting relay, winding of the O counting relay, upper contact of cam 408 to grounded battery through the upper contact of cam 814. The operation of the O counting relay establishes a locking circuit for itself and an operating circuit for the O' counting relay which is effective upon further rotation of interrupter 302. When the conducting portion of interrupter 302 has been disengaged from the interrupter contacts, the shunt is removed from the O' counting relay to cause its operation. It will be noted that at this time the stepping relay 2260 in the sender has operated and released to establish a circuit for operating one set of counting relays, and upon the rotation of interrupter 302 disassociating its conducting segment from its contacts, the fundamental circuit is again established to operate stepping relay 2260. When the interrupter 302 makes a third revolution a second set of counting relays 1 and 1' is operated in the testing device (Fig. 3) and a second set of counting relays is operated in the sender (Fig. 22). In this manner the counting relays of both the sender and testing device continue to operate until the sender counting relays O, FO and BO have been operated. The number of revolutions made by the interrupter 302 is controlled by the number of counting relays to be operated in the sender. The number of counting relays to be operated in the sender is controlled by the setting of the register associated with the counting relays for each selection.

The operation of the BO counting relays opens the fundamental circuit and the operation of the FO counting relay establishes a circuit to rotate the sequence switch (Fig. 22) into a position where it is associated with a second register. The sender counting relays are released upon the rotation of the sequence switch as previously described. It will be remembered that a holding circuit for relay 303 was established over the fundamental circuit, and thus it will release along with the release of relay 2260 as soon as the fundamental circuit is opened. The release of relay 303 opens both circuits from the interrupter 302 to prevent further operation of the counting relays in the testing device. It will be recognized that the operation of the counting relays in Fig. 3 simulates the positioning of a selector switch and is a checking device to record the operation of the counting relays in the sender as controlled from the register that has been set by the testing device.

The release of relay 303 opens the actuating circuit for relay 831. The release of relay 831 establishes an operating circuit for relay 830, if the number of counting relays operated is consistent with the setting of the register switch in the testing device. The pulses for setting the district selector for brush selection are the first to be checked, and since the district brush register switch 650 is set in position 1 and the translator switch of the sender is set according to the setting of the A and B code registers, the O and O' counting relays are the only ones to be operated. Therefore, the circuit for operating relay 830 may be traced from grounded battery through its winding, contacts of relay 831, right upper contacts of cam 824, left upper contacts of cam 656, normal contact of the No. 1 counting relay, contact of the O counting relay, lower contact of cam 409 to ground through the lower contact of cam 811.

The operation of relay 830 establishes an obvious circuit to energize sequence switch magnet 800. The sequence switch, (Fig. 8) rotates from position 1 to position 2. During the rotation of the sequence switch from position 1 to position 2, the energizing circuit for relay 830 is opened to cause its release. The release of relay 830 opens the energizing circuit for sequence switch magnet 800, arresting the rotary movement of the sequence switch in position 2. The rotary movement of the sequence switch (Fig. 8) opens the locking circuit for the counting relays and relays 304, 305 and 306.

If the number of counting relays operated in Fig. 3 does not agree with the setting of the registers in the sender as set by the register switch in the testing device, a circuit for operating relay 830 is not established and the sequence switch (Fig. 8) remains in position 1. The lighting of lamps is used to indicate the progression of the circuit. Therefore, with the sequence switch resting in position 1, the district brush lamp is lighted in series with the match lamp in Fig. 12. This circuit may be traced from grounded battery through the left upper contact of cam 818, lamp 840, left upper and right lower contacts of cam 414, left lower contact of cam 655, lamp 1349 to ground. When the sequence switch (Fig. 8) remains in position 1 for an undue period of time, the time alarm circuit shown in the left lower portion of Fig. 14 is actuated to sound an alarm. The test man, upon his investigation, notes the position of the testing device and operates key 330, which establishes a circuit to light one of the lamps 310 to 319, which will indicate the number of counting relays operated during the establishment of the pulsing circuit. The actuation of relay 330 establishes an obvious energizing circuit for relays 300 and 301. The operation of relays 300 and 301 associates grounded battery through the lamps 310 to 319. Therefore, a circuit is established through a counting relay to light a lamp to indicate the number of counting relays operated. Assuming that two sets of counting relays operated instead of one a circuit is established to light lamp 318. This may be traced from grounded battery through the second left contacts of relay 301, normal contacts of the No. 2 counting relay, contacts of the No. 1 and O counting relays, lower contact of cam 409 to ground through the lower contact of cam 811. Lamp 318 indicates that the O, O', 1 and 1' counting relays are operated instead of only the O and O' counting relays.

As previously described, the sequence switch (Fig. 22) rotated from position 2 to position 4 upon the actuation of the FO counting relay. In this position of the sequence switch a circuit is established to operate relay 832, shown in Fig. 8, of the testing device. This circuit may be traced from ground through the left lower contact of cam 2206, resistance 2055, left outer normal contacts of relay 2053, conductor 1861, brush 1822 and its associated contact, brush 1802 and its associated contact, left outer contacts of relay 1735, upper contact of cam 1719, windings of relays 832 and 833 in parallel to grounded battery. Relay 833 is marginal and does not operate in the circuit traced since the operating circuit for relay 832 is carried through a resistance 2055 to prevent the operation of relay 833. Assuming that the counting relays (Fig. 3) operated in accordance with the register setting and that the check switch (Fig. 8) is rotated to position 2, the operation of relay 832 establishes a circuit to rotate the impulse switch 400 to position 3. This circuit may be traced from grounded battery through the winding of sequence switch magnet 400, right upper contact of cam 410, upper contacts of cam 806, contacts of relay 832, normal contacts of relay 833, right lower contact of cam 617 to ground through the normal contact of relay 830. The rotation of the impulse switch 400 from position 2 to 3 opens the holding circuit for relay 307 to again establish the fundamental circuit through the windings of relays 303 and 2260.

Figure 20:
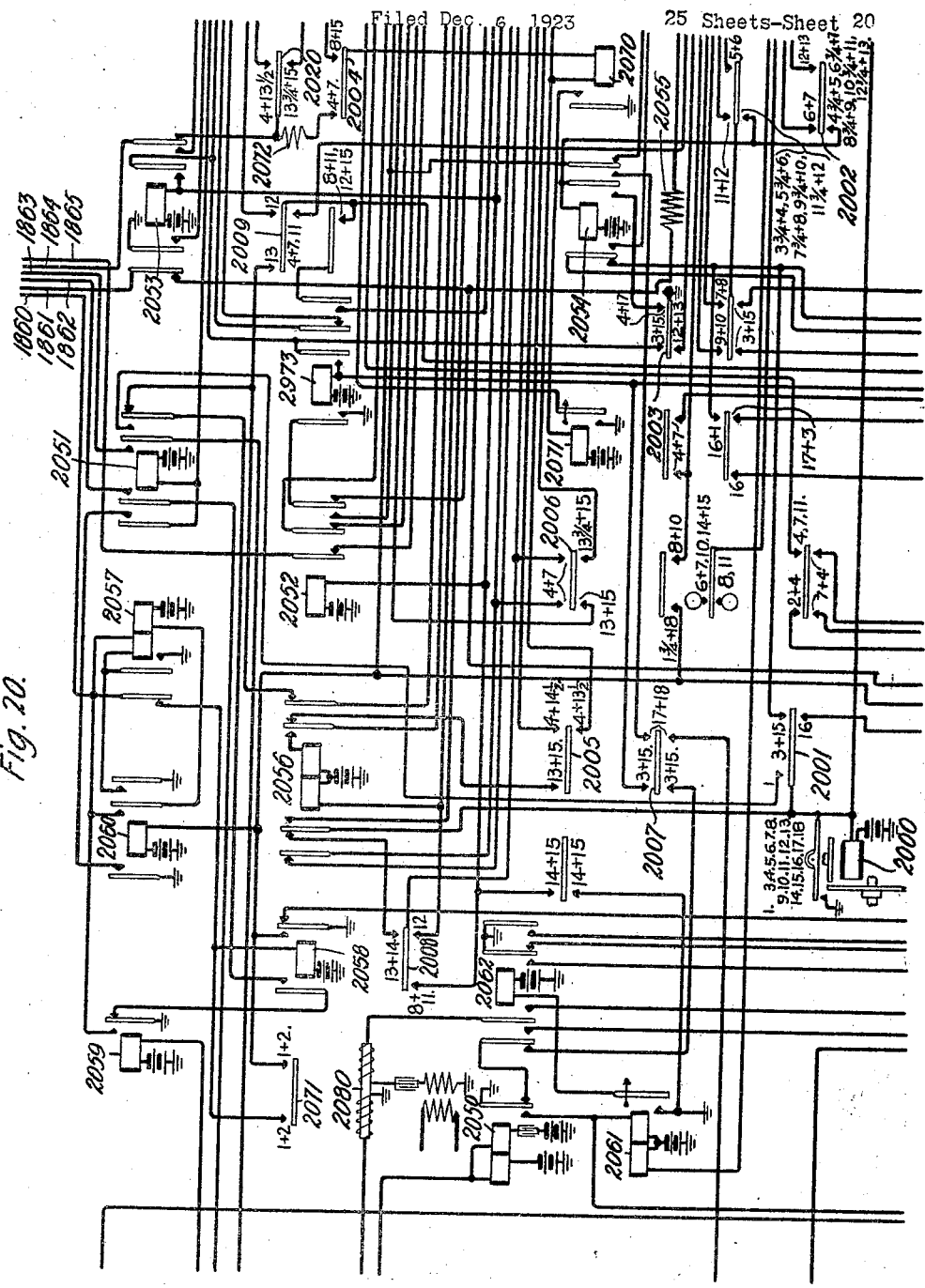

In position 2 of the sequence switch (Fig. 8) a circuit is established over the ringing conductor to operate relay 2056, shown in Fig. 20. This circuit may be traced from ground through the right upper contact of cam 802, left lower and upper contacts of cam 1106, right outer contacts of relay 1735, brush 1816 and its associated contact, brush 1826 and its associated contact, conductor 1865, right inner contacts of relay 2052, left outer normal contacts of relay 2252, right upper contact of cam 2209, left winding of relay 2056 to grounded battery. The operation of relay 2056 establishes circuits as previously described under the description of the sender.

The operation of relay 303 establishes a locking circuit for itself and operating circuits for relays 307, 304, 305 and 306, as previously described. Interrupter 302 is again operated and establishes the shunt to release stepping relay 2260. In this manner the counting relays of the sender and testing device are again operated to check the setting of the registers of the sender circuit for district group selection.

As previously stated, the office selector switch register and translator are not set for this test and the office brush register switch 915 is set to indicate the position for skip office. The positioning of the office brush register switch in this manner advances the check switch 800 through its positions for checking the office brush and office group selections. Upon the completion of district group selection relay 830 is operated to rotate the sequence switch (Fig. 8) from position 2 to position 3 and a locking circuit is established to maintain relay 830 operated until the sequence switch is rotated to position 5. This circuit may be traced from grounded battery through the winding of relay 830, contacts of relay 831, upper contact of cam 821 to ground through the lower contact of cam 922 on the office brush register switch. Position 5 of the check switch (Fig. 8) is not used in this test since it applies to relay call indicator selections. Therefore, a circuit is established through the class switch 610 to rotate the check switch (Fig. 8) from position 5 to position 6. This circuit may be traced from grounded battery through the winding of magnet 800 to ground through the contacts of relay 830. The circuit to maintain relay 830 in an operated position to rotate the sequence switch from position 5 may be traced from grounded battery through the winding of relay 830, normal contacts of relay 831, left upper contact of cam 820 to ground through the left upper contact of cam 627. Upon the rotation of the check switch (Fig. 8) from position 5 to position 6, relay 830 releases, arresting the rotary movement of the sequence switch in position 6.

At the termination of the check test of district group selections the impulse switch 400 is rotated from position 3 to position 4. This circuit may be traced from grounded battery through the winding of magnet 400, right lower contact of cam 410, left lower contact of cam 806, contacts of relay 832, normal contacts of relay 833, right lower contacts of cam 617 to ground through the normal contacts of relay 830. The impulse switch is now resting in position 4, in which position the office brush pulses are checked. Also, in position 5 the office group pulses are checked. Since in this test the office pulses are not checked, a circuit is established to rotate the impulse switch from position 4 to 5. The circuit to energize the impulse switch magnet may be traced from grounded battery through the winding of magnet 400, left upper contact of cam 411 to ground through the left upper contact of cam 922. In position 5 the magnet of the impulse switch is again energized from grounded battery through the winding of magnet 400, right lower contact of cam 410, left lower and right upper contacts of cam 806, contacts of relay 832, normal contacts of relay 833, right lower contact of cam 617 to ground through the normal contacts of relay 830.

It will be remembered that the control switch 1100 is resting in position 14. Upon the rotation of the impulse switch into position 6, a circuit is established to rotate the control switch 1100 from position 14 to position 15. This circuit may be traced from grounded battery through the winding of magnet 1100, right upper contact of cam 1101 to ground through the left lower contact of cam 420. The control switch 110 now rotates from position 15 to position 17 under the control of the magnet contact. The control switch in position 17 establishes a circuit to rotate the impulse switch 400 from position 6 to position 8. This circuit may be traced from grounded battery through the winding of magnet 400, right lower contact of cam 411, right upper and left lower contacts of cam 1117 to ground through the left lower contact of cam 420. During the rotation of the impulse switch 400 through positions 6 and 7, a non-operate test is applied to relay 2070 (Fig. 20) through its winding in the same manner as during a service connection. The ohmic resistance in the circuit for making this test is such that a more severe non-operate test is applied than required by service conditions. The circuit for making the non-operate test may be traced from grounded battery through the winding of relay 308, upper contacts of cam 625, left upper contact of cam 407, thence over the fundamental circuit as previously traced to conductor 1864, through the right outer normal contacts of relay 2053, resistance 2072, winding of relay 2070, through the left upper contact of cam 2209, left outer normal contacts of relay 2252, inner normal contacts of relay 2052, conductor 1865, and thence over the fundamental circuit as previously traced to the lower contact of cam 803 to ground through the right upper contact of cam 418. Relays 2070 and 308 do not operate unless relay 2070 is out of adjustment. It will be remembered that in the description of the sender circuit, the operation of relay 2070 operates relay 2071 and that the operation of relay 2071 operates relay 2255 and the operation of relay 2255 rotates the sequence switch. Therefore, if relay 2071 operates during application of the non-operate current, the sequence switch (Fig. 22) is rotated to change the circuit established to a low resistance circuit which will operate relay 308. The operation of relay 308 arrests the progressive movement of the testing device in position 8 of switch 400. After a predetermined period of time the alarm shown in Fig. 14 is actuated. The operation of relay 308 further establishes a circuit to light lamp 309 when the impulse switch is rotated to position 8. This circuit may be traced from grounded battery through the left lower and right upper contacts of cam 414, lamp 309 to ground through the operating circuit of relay 308.

Assuming that relay 2070 does not operate upon the application of the non-operate current value, the circuit is not established to operate relay 308. When the impulse switch has rotated to position 8, a circuit of higher voltage is associated with relay 2070 in the sender circuit to cause its operation. This circuit may be traced from grounded battery through the winding of relay 303, normal contact of the No. 10 counting relay, left normal contact of relay 309, left normal contact of relay 308, lower contact of cam 405, and thence over the fundamental circuit as previously traced to conductor 1864, through the right outer normal contacts of relay 2053, resistance 2072, winding of relay 2070, left upper contact of cam 2209, left outer normal contacts of relay 2252, inner contacts of relay 2052, conductor 1865 and thence over the ring conductor of the fundamental circuit, lower contact of cam 802 to ground through resistances 860 and 861. The operation of relay 2070 establishes circuits to rotate the sequence switch (Fig. 22) to position 12 for incoming brush selection. Relay 303 is not operated in the circuit traced for operating relay 2070. However, when the sequence switch (Fig. 22) rotates to position 12, the low resistance fundamental circuit through stepping relay 2260 is again established to cause the operation of relays 2260 and 303.

The incoming brush and incoming group selections are now checked in rotation, advancing the impulse switch 400 one position after the check of each selection. It is therefore rotated to position 10 for the next check test. The check switch 800 is also advanced one position upon the completion of each check test and is therefore advanced to position 8 for the check of the final brush selection.

The selections for the final brush, final tens and final units are checked in the manner described for district brush selection and the impulse switch 400 is advanced to position 14 for checking the station hundreds selection. Also, the check switch 800 is advanced to position 12 for this selection.

Upon the completion of the check of final units selections, a check is made of the registration for station hundreds, station units and station tens in the manner described for preceding selections.

It will be remembered in the description of the sender that when the incoming selector, making a service connection, has advanced to the position of trunk closure and final selection and station selection have been made, battery and ground are reversed over the fundamental circuit to operate relay 2261 to advance the sender for talking selection. Thus, in position 15 of the check switch 800 and position 17 of the impulse switch 400, grounded battery through relay 303 is connected to the ring conductor 1865 of the fundamental circuit and ground is connected to the tip conductor 1864 of the fundamental circuit. The reverse battery fundamental circuit may be traced from grounded battery through the winding of relay 303, contacts of the counting relay 10′, right upper contact of cam 405, right upper contact of cam 803, left lower and upper contacts of cam 1106, right outer contacts of relay 1735, brush 1816 and its associated contact, brush 1826 and its associated contact, conductor 1865, thence through the winding of stepping relay 2260 and overflow relay 2261 to conductor 1864 which is traced under the description of the sender circuit, from conductor 1864 through brush 1805 and its associated contact, brush 1806 and its associated contact, right inner contacts of relay 1735, upper and lower contacts of cam 1105, resistances 860 and 861 to ground, operating relay 303 and the sender relays 2260 and 2261.

The operation of relay 303 establishes a circuit to rotate the impulse switch 400 from position 17 to 18. This circuit may be traced from grounded battery through the winding of magnet 400, left lower contact of cam 412, contact of cam 629, right lower contact of cam 415 to ground, through the inner contacts of relay 303. Upon the rotation of the impulse switch 400, the fundamental circuit is opened to release relay 303. Upon the operation of the sender apparatus, as described for talking selection, the actuating circuit for relay 832 in the testing device is opened to cause its release. The release of relay 832 establishes a circuit to rotate check switch 800 to position 16. This circuit may be traced from grounded battery through the winding of magnet 800, upper contact of cam 801, normal contacts of relays 832 and 833, right lower contact of cam 617 to ground through the normal contacts of relay 830.

The talking selection is now checked for the operation of one set of counting relays in the manner previously disclosed and relay 830 is operated through the checking contacts of the talking selection register switch 600 which is resting in position 1. The checking circuit may be traced from grounded battery through the winding of relay 830, left lower contacts of cam 821, left contacts of cam 624, left upper contacts of cam 606, contacts of the counting relays, lower contact of cam 409 to ground through the lower contact of cam 811. The operation of relay 830 establishes an obvious circuit to rotate the check switch 800 from position 16 to position 17. During the rotation of the check switch from position 16 to 17, the actuating circuit for relay 830 is opened to cause its release.

The control switch shown in Fig. 11 is now rotated to position 18. The circuit established to rotate the control switch may be traced from grounded battery through the winding of 1100, left lower contact of cam 1101, right upper contact of cam 403, right lower contact of cam 404 to ground through the lower contact of cam 807. The dial pulsing circuit is now opened to release a part of the sender apparatus. A circuit is now established to rotate the impulse switch 400 from position 18 to position 1. This circuit may be traced from grounded battery through the winding of magnet 400, left upper contact of cam 410 to ground through the left upper contact of cam 807. The rotation of the impulse switch to position 1 establishes a circuit to rotate the check switch, Fig. 8, to position 18. This circuit may be traced from grounded battery through the winding of magnet 800, right lower contact of cam 801 to ground through the right lower and upper contacts of cam 401.

As previously described, relay 1680 operates and locks upon the rotation of the control switch 1100 into position 11. A circuit is now established through the contacts of relay 1680 to rotate the route control switch 1650 from position 2 to position 3. This circuit may be traced from grounded battery through the winding of magnet 1650, left contacts of relay 1680, contact 1461 of key 1430 to ground through the right upper contact of cam 807. The rotation of the route control switch from position 2 to position 3 opens the locking circuit for relay 1680 to cause its release. The release of relay 1680 establishes an energizing circuit for relay 1739 from grounded battery through the left lower contact of cam 1701, upper contacts of cam 809, contacts 1464 of key 1430, left outer normal contacts of relay 1680 to ground through the lower contacts of cam 1658.

The operation of relay 1739 establishes an obvious circuit to operate relay 1737. The operation of relay 1737 opens the holding circuit for relays 1735 and 1736 to cause their release to disconnect the control leads from the sender. The operation of relay 1737 further establishes a circuit to rotate the check switch 800 to position 1. This circuit may be traced from grounded battery through the winding of magnet 800, left lower contact of cam 801, contacts of cam 1721, left inner contacts of relay 1737 to ground through the left outer normal contacts of relay 1733. The ground is now disconnected from the test conductor 1860 to release apparatus in the sender, causing it to restore to normal. During the period of time that the sender is restoring to normal it maintains itself busy by associating a ground with conductor 1860. A circuit is thus established to maintain relay 1739 operated until the sender is restored to normal. This circuit may be traced from grounded battery through the left winding of relay 1739, left contact of relay 1737, brush 1812 and its associated contact, brush 1821 and its associated contact, conductor 1860 to ground in the sender circuit. The control switch, Fig. 11, is now rotated to position 1 from grounded battery through the winding of magnet 1100, upper contact of cam 1108, lower contacts of cam 815 to ground through the right lower and upper contacts of cam 401. When the sender is restored to normal the ground is disconnected from conductor 1860 and thus it is disconnected from the energizing circuit through the left winding of relay 1739 to cause its release. The release of relay 1739 releases relay 1737.

The release of relay 1737 reoperates relays 1735 and 1736 as previously described to replace a ground upon the test conductor 1860 of the sender, thus maintaining the sender busy to prevent its seizure by a selector switch making a service connection. The sender testing device is now prepared to make a second one of the multi-tests of the sender.

The second test to be made of the sender is a test of its apparatus to check its ability to control selectors to extend a call to a subscriber's station in the office in which the call is initiated. This test is known as a mechanical direct test.

With the check switch 800 in position 1, the control switch 1100 in position 1 and the route control switch 1650 in position 3, control magnets 650, 900, 915, 930, 945 and 960 energize to rotate the register switches for checking district brush and group selection and office brush and group selection, and to control the setting of the A and B code registers of the sender. The rotation of the above register switches is arrested by the operation of relays associated with each switch in a position determined by the cross connection between the cams of the route control switch 1650 and the cams of each register switch. The above register switches are set for a code and routing suitable for a mechanical direct call without stations. The cross connections between the above switches is shown by like numerals on the register switches and on the route control switch. When all of the registers are set, the control switch, Fig. 11, advances to position 2 and in this position establishes a circuit as previously traced to set numerical switches 975, 1200, 1230 and 1250, the class switch 610 and the talking selection switch 600 as previously described. The numerical register switches are set for this test to control the registers of the sender to direct selector switches for No. 9689 in accordance with the setting of the numerical switch, Fig. 15.

The registers of the sender are positioned in the same manner as that described for test No. 1. The translator of the sender is again positioned in accordance with the setting of the code A and code B registers 2110 and 2300. The setting of the registers in the sender is now checked by the testing device in the manner described for test No. 1. The setting of the class switch 610 rotates the apparatus of the testing device through positions not required for this test.

Upon the completion of this test the route control switch 1650 and the numeral switch 1500 are advanced one position and the sender is restored to normal for a third test.

Test No. 3 directs a call to a local operator and the numerical switches do not receive another setting. This class of call occurs when the zero operator is dialed. The setting given the code A register in the sender is translated by the sender into district brush, district group, office brush and office group according to the location of the trunks of the local operator's position. The register switches in the testing circuit are cross connected according to this location. This test is similar to test Nos. 1 and 2 with the exception of details of sender operation and it is thought unnecessary to describe it in detail.

Tests Nos. 4 and 5 are not made during the majority of routine tests. Since they are not material to the disclosure for this invention, they will not be described. Key 1540 in its normal position rotates switches 1500 and 1650 through these testing positions.

Test No. 6 is a test of the sender relay call indicator pulsing mechanism. This test is made by setting the registers of the sender, not including the station register, and is the same as test No. 7, which is hereinafter described in detail.

Test No. 7 discloses a test of the sender for controlling a call to a relay call indicator office and includes the setting of the station registers for controlling the call to a distant office.

*Test #7.*

*Tandem relay call indicator—With stations.*—The route control switch 1600 and numerical switch 1500 are each advanced to position 8 to test the tandem relay call indicator functioning in the sender. During its regular operation for this class of call, the sender transmits pulses to display the called number of the call indicator functioning in the sender. During its regular operation for this class of call, the sender transmits pulses to display the called number of the call indicator lamps at a distant office. In this test, after the registers of the sender are set, it transmits pulses to the testing device to check each digit for which the registers are set.

Register switches 650, 900, 915, 930, 945 and 960 are set in accordance with cross connections to the route control switch 1500 in position 8. The numerical switches 975, 1200, 1230 and 1250, station switches 1270, 1300 and 1320, and the class switch 610 are set in accordance with connections to those switches from the cams in position 8 of numerical switch 1500.

The registers and translator of the sender are set for a call to a relay call indicator office in the manner described for a mechanical call. The high speed interrupter 1050 is used for this test, since relay 1120 is in its normal position. One revolution of interrupter 1050 is made to set each register in the sender and the release of relay 1126 after each revolution of interrupter 1050 positions the control switch 1100 for the next registration. Control switch 1100 is thus rotated from position 2 to position 12 during the transmission of dial pulses to control the setting of the sender registers. A circuit is established in position 12 of control switch 1100 to operate relay 1680 from grounded battery through its winding, contacts 1462 of key 1430 to ground through the right lower contact of cam 1103. The operation of relay 1680 establishes a circuit to rotate the control switch 1100 from position 12 to 13. This circuit may be traced from grounded battery, through the winding of magnet 1100, left upper contact of cam 1102, right upper contacts of relay 1680 to ground through the lower contact of cam 1658. The control switch is now rotated to position 14 by the energization of its magnet from grounded battery through the winding of magnet 1100, left lower contact of cam 1101 to ground through the left upper contact of cam 418.

The operation of the A and B code registers 2110 and 2300 in the sender circuit is the same as previously described or a mechanical call. The translator is set to control selection for the district brush, district group, office brush and office group selection. The operations of the counting relays in the sender and the counting relays in the testing device for checking pulses transmitted during selection are the same as previously described for any mechanical call.

The checking switch 800 upon the completion of checking the office group selections is advanced to position 5 to establish the fundamental circuit for checking the relay call indicator pulses. The tip conductor of the fundamental may be traced from grounded battery, through resistance 132, winding of relay 121, resistance 130, lower contacts of cam 618, left upper contact of cam 805, lower and upper contacts of cam 1105, right inner contacts of relay 1735, brush 1806 and its associated contact, brush 1825 and its associated contact, conductor 1864, right outer normal contact of relay 2073, resistance 2072, winding of relay 2070, left upper contact of cam 2209, left upper normal contact of relay 2252, right inner contacts of relay 2052, contact 1865, brush 1826 and its associated contact, brush 1806 and its associated contact, right outer contacts of relay 1735, left upper and lower contacts of cam 1106, left upper contact of cam 802, resistance 131 to ground through the right contact of relay 122. Relays 121 and 2070 are operated in the fundamental circuit traced. The resistances in the fundamental circuit are chosen to produce as nearly as possible the most severe operating conditions for relay 2070 in the sender. The operation of relay 2070 advances the sender as described under sender.

The operation of relay 121 establishes a circuit to operate relay 124. The operation of relay 124 associates ground circuits with the contacts of register relays and lamp relays, shown in Figs. 1, 2 and 5, for the purpose of establishing locking circuits when these relays are operated. The impulse switch 400 is resting in position 5 upon the completion of checking the office group selection. The operation of relay 124 further establishes a circuit to rotate the impulse switch 400 from position 5 to position 6. This circuit may be traced from grounded battery through the winding of magnet 400, left upper contact of cam 412 to ground through the left outer contacts of relay 124.

The rotation of the impulse switch 400 into position 6 establishes a circuit to operate relay 123 from grounded battery, through the winding of relay 123, lower contacts of cam 625, to ground through the left upper contacts of cam 420. The operation of relay 123 establishes an obvious circuit to operate relay 122. The operation of relay 123 further associates ground circuits with the contacts of the register and lamp relays, Figs. 1, 2 and 5, for the purpose of establishing locking circuits when these relays have been operated. A further circuit is established in position 6 of the impulse switch 400 to rotate the control switch 1100 into position 15. This circuit may be traced from grounded battery through the winding of magnet 1100, right upper contact of cam 1101 to ground through the left lower contact of cam 420. The control switch 1100 now rotates to position 17 under the control of its magnet contact.

The operation of relay 122, as previously described upon the operation of relay 123, simulates an assignment operation in the relay call indicator switchboard position and associates the fundamental circuit with polarized relays 117, 118 and 119. The three last mentioned relays record the pulses from the sender impulse switch, Fig. 24, to operate the register and lamp relays. Relay 2070 releases upon the operation of relay 122 since battery and ground have been removed from the fundamental circuit. The operation of relay 122 further opens the actuating circuit for relay 121 to cause its release.

It is thought that a description of the positioning of the apparatus in the sender will be of assistance in the understanding of the testing device at this point of operation.

As previously described the registers of the sender are controlled by the testing device in the manner described for full mechanical call. The registers are positioned to control selections through the translators in a manner to associate selector switches with a tandem relay call indicator office. It will be remembered that in the previous description of the sender, relay 2171 operated to advance the class switch 2000. The rotation of switch 2000 establishes a circuit through the translator switch to operate relay 2054, thus arresting the rotary movement of switch 2000 in position 13. A circuit is established to operate relay 2054 from grounded battery, through its winding, lower and right upper contacts of cam 2002, translator switch, brush 2368 and its associated contact to ground through the left contacts of relay 2171. Relay 2054 in operating establishes a locking circuit for itself from grounded battery through its winding and right inner contact to ground through the right upper contact of cam 2003. The operation of relay 2054 further establishes a circuit to rotate the sequence switch 2200 from position 1 to position 2. This circuit may be traced from grounded battery, through the winding of magnet 2200, left upper contact of cam 2202, left contacts of relay 2054 to ground through the right contacts of relay 2171. With sequence switch 2200 in position 2 a circuit is established to operate relay 2430 from grounded battery through its winding, upper contact of cam 2411, right lower and upper contacts of cam 2412, upper contact of cam 2215, left contacts of relay 2054 to ground through the right contacts of relay 2171.

The sequence switch cams, shown within the dotted lines, in the left lower portion of Fig. 24, are associated with class switch (Fig. 20) and controlled by sequence switch magnet 2000. The counting relays to be operated for controlling district brush and district group selections are connected to cams 2022 and 2023, shown in Fig. 24.

In position 2 of the sequence switch 2200, the fundamental circuit is established for district brush selection the same as described for a mechanical call and relays 303, and 2260 are operated. Relay 2056 is also operated the same as previously described. The pulses transmitted from interrupter 302 release and reoperate the stepping relay to operate the counting relays required for tandem routing. When the district brush selection is completed, the FO and BO counting relays operate to open the fundamental circuit and advance sequence switch 2200 to position 4. In position 4 the fundamental circuit is again established for district group selection and when sufficient pulses have been transmitted the fundamental circuit is again opened. Relay 2056 is released upon the completion of district group selection and sequence switch 2200 is advanced to position 6 for office brush selection. The office brush and group selections are now made and checked by the testing device, switch 2200 advancing after each selection. Upon the completion of office group selection, switch 2200 is advanced to position 9. In positions 8 to 10 of sequence switch 2200 a locking circuit is established for relay 2430 from grounded battery, through its winding and left inner contact, lower contacts of cam 2413, to ground through the right upper contact of cam 2211. Relay 2430 remains locked until the impulse switch 2400 rotates through position 3 of a second revolution. It will be remembered that the impulse switch is at this time resting in position 13.

When all the registers of the sender have been set under the control of interrupter 1050 the register control switch 2100 is rotated to position 9. As soon as the district and office selections have been checked by the testing device, switch 2200 rotates to position 9. With the register control switch 2100 in position 9 and sequence switch 2200 in position 9 a circuit is established to rotate the sequence switch 2200 to position 10. This circuit may be traced from grounded battery through the winding of magnet 2200, right inner contact of cam 2202, upper contact of cam 2414, right upper contacts of relay 2056, left upper contacts of cam 2009, brush 2105 and associate contact in position 9 to ground on the right inner contacts of relay 2062.

Figure 1:
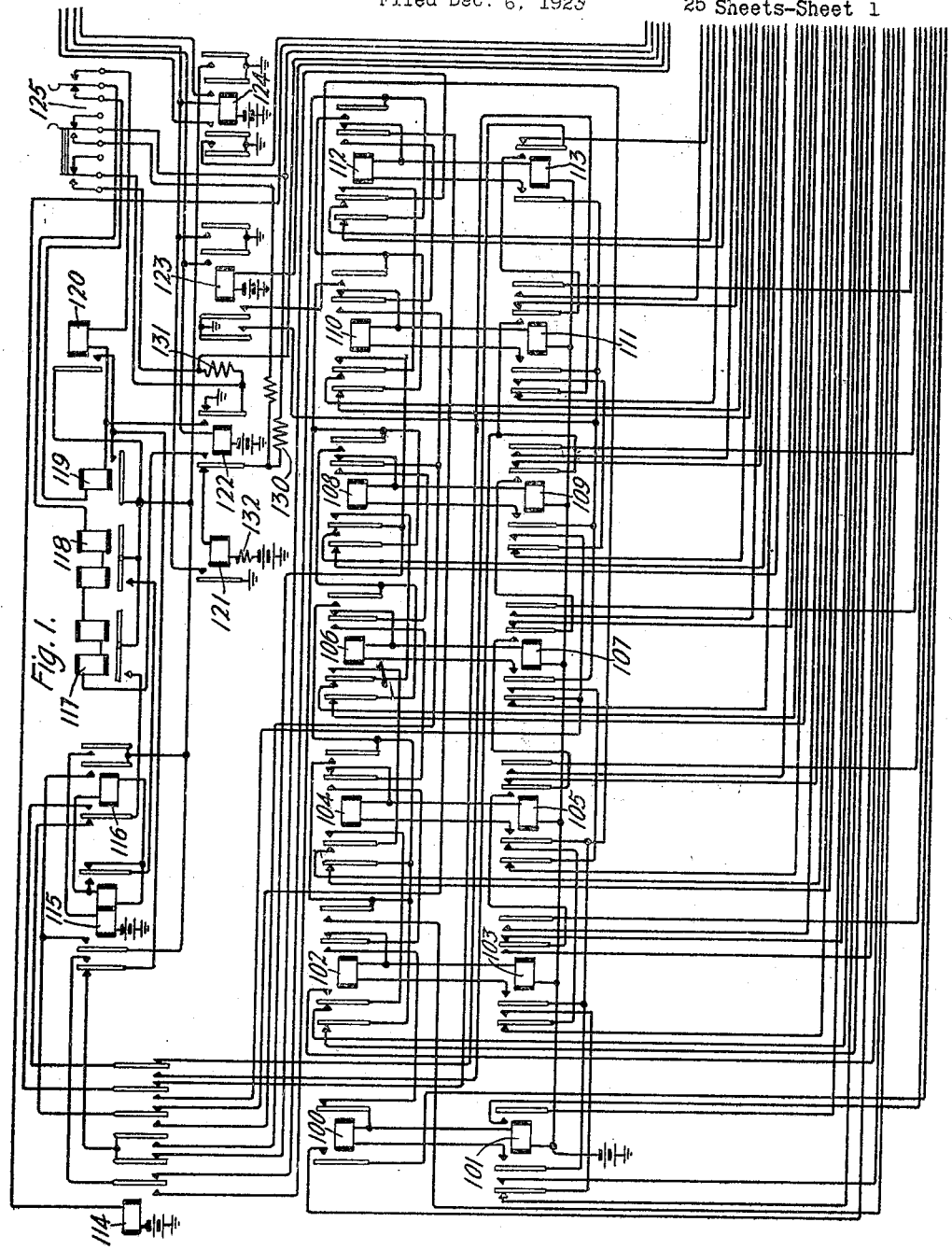
Figure 2:
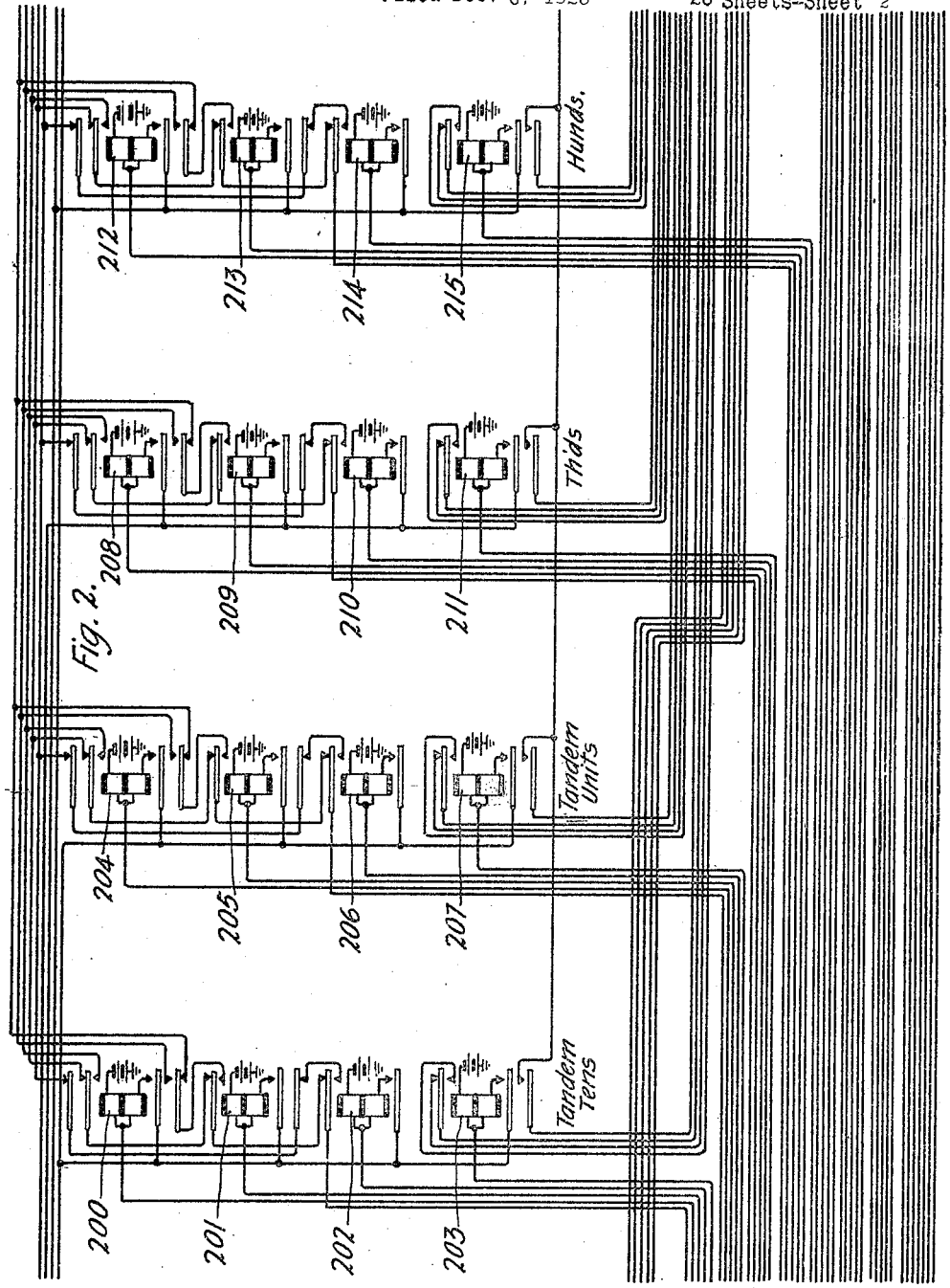

The fundamental circuit is now established as previously traced to operate relay 2070 in the sender and relay 121 in the testing device, Fig. 1. The operation of relay 2070 operates relay 2071 and the operation of relay 2071 operates relay 2255 as described in a mechanical call. The operation of relay 2255 establishes a circuit to rotate sequence switch 2000 to position 15. This circuit may be traced from grounded battery, through the winding of magnet 2000, left inner normal contacts of relay 2056, upper contact of cam 2008, right inner contacts of relay 2255 to ground through the contacts of relay 2071. As previously described the operation of relay 122, shown in Fig. 1, removes battery and ground from the fundamental circuit, releasing relays 2070, 2171 and 2255. The release of relay 2255 extends the fundamental circuit to the impulse switch 2400. The release of relay 2255 further establishes a circuit to rotate the impulse switch 2400 from position 13 to 18 completing the first revolution and from position 1 to 18 to complete a second revolution. A circuit for energizing sequence switch magnet 2400 for both revolutions may be traced from grounded battery, through winding of magnet 2400, left inner contact of cam 2401, lower contact of cam 2024, lower contacts of cam 2216, right middle contacts of relay 2052, left outer contacts of relay 2255 to ground through the left upper contact of cam 2003.

During the continuous advance of the impulse switch from position 1 to position 18 upon the second revolution, pulses are transmitted over the fundamental circuit to operate the proper combinations of register and lamp relays, shown in Figs. 1, 2 and 5. A detailed description of the operation of the register and lamp relays, the same as shown in Figs. 1, 2 and 5, from pulses transmitted by the pulsing switch, the same as in Fig. 24, is described in Patent No. 1, 533,477 to F. A. Stearn and J. C. McAuliffe, issued April 14, 1925. Therefore, a description of the manner in which these relays are set will not be included in this specification.

It will be remembered that the impulse switch 400 is resting in position 6 and that class switch 610 is controlled for this test to be stationed in position 8. The circuit is established through the cams of these switches to rotate the impulse switch to position 11. This circuit may be traced from grounded battery through the winding of magnet 400, left lower contact of cam 410 to ground, through the left lower contact of cam 627.

The impulses received from the sender impulse switch are checked in the following positions of the impulse switch 400:
  Tandem tens—position 11.
  Tandem units—position 12.
  Stations—position 13.
  Thousands—position 14.
  Hundreds—position 15.
  Tens—position 16.
  Units—position 17.

The register switches for the selections are as follows:
  Tandem tens 112 and 113.
  Tandem units 110 and 111.
  Stations 108 and 109.
  Thousands 106 and 107.
  Hundreds 104 and 105.
  Tens 102 and 103.
  Units 100 and 101.

The lamp relays for each registration are as follows:
  Tandem tens 200 to 203 inclusive.
  Tandem units 204 to 207 inclusive.
  Stations 508 to 511 inclusive.
  Thousands 208 to 211 inclusive.
  Hundreds 212 to 215 inclusive.
  Tens 500 to 503 inclusive.
  Units 504 to 507 inclusive.

The following tabulation indicates the operation of certain of the lamp relays to light certain of the relay call indicator lamps shown in Fig. 5.

*Relays operated.*

| No. indication. | Lamp No. | Tandem tens. | Tandem units. | Stations. | Thousands. | Hundreds. | Tens. | Units. |
|---|---|---|---|---|---|---|---|---|
| 0 | 516 | Normal. | Normal. | Normal. | Normal. | Normal. | Normal. | Normal. |
| 1 | 518 | 200 | 204 | 508 | 208 | 212 | 500 | 504 |
| 2 | 521 | 201 | 205 | 509 | 209 | 213 | 501 | 505 |
| 3 | 519 | 200 | 204 | 508 | 208 | 212 | 500 | 504 |
|  |  | 201 | 205 | 509 | 209 | 213 | 501 | 505 |
| 4 | 514 | 202 | 206 | 510 | 210 | 214 | 502 | 506 |
| 5 | 515 | 203 | 207 | 511 | 211 | 215 | 503 | 507 |
| 6 | 517 | 200 | 204 | 508 | 208 | 212 | 500 | 504 |
|  |  | 203 | 207 | 511 | 211 | 215 | 503 | 507 |
| 7 | 520 | 201 | 205 | 509 | 209 | 213 | 501 | 505 |
|  |  | 203 | 207 | 511 | 211 | 215 | 503 | 507 |
| 8 | 522 | 200 | 204 | 508 | 208 | 212 | 500 | 504 |
|  |  | 201 | 205 | 509 | 209 | 213 | 501 | 505 |
|  |  | 203 | 207 | 511 | 211 | 215 | 503 | 507 |
| 9 | 513 | 202 | 206 | 510 | 210 | 214 | 502 | 506 |
|  |  | 203 | 207 | 511 | 211 | 215 | 503 | 507 |

One of the relay call idicator lamps 513 to 522 is illuminated upon the check of each set of pulses. Each set of pulses operates one set of the lamp relays which lock awaiting the rotation of this impulse and check switches. The control of these lamps differs from the lamps usually associated with relay call indicator apparatus. It has been the custom to supply a large number of lamps which may be illuminated to show a complete series of numbers to indicate the stations and numerical numbers. Lamps 513 to 522 are controlled through the contacts of the impulse switch, the contacts of each register switch and the contacts of a particular set of lamp relays set by the impulses being checked. This control of the lamps materially decreases the number of lamps necessary for testing this type of apparatus.

Let is be assumed that for tandem tens the registration has been made to transmit the pulses to indicate the number "8". For this number, pulses must be transmitted from the sender to the relay call indicator apparatus to operate lamps relays 200, 201 and 203. Upon the operation of such lamp relays, a circuit is established to operate relay 512 to associate lamp 522 indicating No. 8 with the control circuit. The circuit established for operating relay 512 may be traced from grounded battery through its winding, right outer contacts of relay 203, left upper contact of cam 421 to ground through the left lower contact of cam 619. A circuit is now established to light lamp No. 522 indicating No. 8, which may be traced from grounded battery, through lamp No. 522, fourth right contact of relay 512, right outer contacts of relay 200, left contacts of relay 201, left normal contacts of relay 202, right outer contacts of relay 111, upper left and right contacts of cam 404 to ground through left lower contact of cam 619. Simultaneously with the establishment of the circuit to light lamp 522 a circuit is established to operate relay 430. This circuit may be traced from grounded battery, through the winding of relay 430, right upper contact of cam 417, left contacts of relay 203, right lower contacts of cam 956, right lower contacts of cam 955, right outer contacts of relay 200, left contacts of relay 201, left normal contacts of relay 202, right outer contacts of relay 111, upper left and right contacts of cam 404 to ground through the left lower contact of cam 619. The operation of relay 430 establishes an obvious circuit to rotate the impulse switch 400 from position 11 to position 12. During the rotation of the sequence switch, the actuating circuit is opened to cause its release. Also the circuit for lighting lamp 522 is opened.

It is apparent from the tracing of the above circuits to operate relay 430 that, if the lamp relays are not set in accordance with the setting of the register switch 945, the circuit for operating relay 430 is not established and the automatic progression of the testing device is arrested. Similarly, if the lamp relays are not correctly operated, a lamp other than lamp 522 is lighted and will indicate a different number than No. 8.

In position 11 of the impulse switch 400 in which the tandem tens registration is checked, a circuit is established to light the relay call indicator progress lamp 437 and the match lamp 1340 from grounded battery through the left upper and lower contacts of cam 622, lamp 437, lamp 1340 to ground. The match lamp 1340 indicates the setting of the register switch. The progress lamp 437 indicates that tandem tens pulses are being checked and the relay call indicator lamp 522 indicates that the register and translator of the sender is correctly set and the pulses were properly transmitted to the testing device by the sender to indicate the number "8"; also that the sender is in condition to properly transmit relay call indicator pulses for tandem tens during service connections.

If a number other than 8 is indicated by the lighting of a different relay call indicator lamp than lamp 522 and the progress of the testing device is arrested, the time alarm circuit shown in Fig. 14 is actuated to attract the attention of the test man. The lighting of match lamp 1340 indicates to the test man the setting of the register switch. The relay call indicator progress lamp 437 indicates that tandem tens pulses are being checked, and thus from the position of these switches the test man, by referring to his chart, determines that the relay call indicator lamp 522 should be lighted to indicate No. 8. The test man notes the lamp that has been lighted and can now trace the trouble in the sender from the indications in the sender testing device.

In position 12 of the impulse switch, the tandem units pulses are checked through the contacts of lamp relays 204 to 207 inclusive in the same manner as described for tandem tens pulses, and the impulse switch 400 is advanced to position 13. In position 13, 14, 15, 16 and 17 of the impulse switch 400, the pulses are checked for stations, thousands, hundreds, tens and units respectively, through the contacts of lamp relays 508 to 511, 208 to 211, 212 to 215, 500 to 503 and 504 to 507 respectively. The impulse switch is then rotated to position 18.

In position 18 of the impulse switch 400, a circuit is established to rotate the check switch 800 to position 15 by the operation of relay 830. A circuit for operating relay 830 may be traced from grounded battery, through its winding, contacts of relay 831, right upper contact of cam 820, lower contacts of cam 626 to ground, through the right lower contacts of cam 420. The circuit for actuating the winding of sequence switch magnet 800 is obvious and need not be traced. Upon the rotation of the sequence switch, Fig. 8, through position 14, the actuating circuit for relay 830 is opened to cause its release, arresting the rotary movement of the sequence switch in position 15. The sender now advances to open the actuating circuit for relay 832 to cause its release. The release of relay 832 establishes a circuit to rotate the check switch (Fig. 8) to position 16. This circuit may be traced from grounded battery, through the winding of magnet 800, upper contact of cam 801, normal contacts of cam relays 832 and 833, right lower contacts of cam 617 to ground through the normal contacts of relay 830.

Talking selection is now made in the same manner as described for talking selection in the test of a mechanical call, and the sender is restored to normal. The switches of the testing device are reset, as previously described. The rotation of the impulse switch 400 to position 1 opens the actuating circuit for relays 122, 123 and 124 to cause their release. The release of the above relays opens the holding circuit for the relay call indicator register and lamp relays to cause their release. The test device is now advanced to make other tests of the sender, as previously described.

Test No. 8 is a test to check office overflow. This test checks the operation of the sender as it should function when the office selector is driven to the overflow terminals during trunk hunting. During a service connection when the office selector is associated with the overflow terminals battery and ground are reversed with relation to the fundamental circuit, operating relay 2061 in the sender. The operation of relay 2061 causes the sender to advance as previously described, advancing the district to make talking selection and both the sender and district are restored to normal.

This test is made with the register switches of the testing device set for a full mechanical code and the numerical register switches are set to cooperate with the interrupter 1000 or 1050 to control the registers of the sender for No. 1111. The registers of the sender are set as described for a mechanical call with the exception of the stations registers which are not set. In position 12 of switch 1100 the circuit for operating relay 1680 is established the same as previously described to advance the control switch to position 13 and the control switch advances from position 13 to 14 over a circuit established to ground on the impulse switch as previously traced. The sequence switch 1100 now advances from position 14 to 17 under the control of the impulse switch 400.

The selections are checked as in the case of full mechanical calls until office group selections have been checked, check switch 800 being advanced to position 4 and relay 830 operated to advance the check switch 800 to position 5. In position 5, relay 830 reoperates to ground on the class switch to advance check switch 800 to position 15. When the sequence switch rotates out of position 14, the actuating circuit for relay 830 is opened to cause its release, arresting the rotary movement of the sequence switch in position 15. The impulse switch 400 is now rotated from position 5 to position 17 by a circuit established to energize its magnet from grounded battery through magnet 400, right lower contact of cam 412 to ground through the right upper contact of cam 808. With the impulse switch 400 in position 17, battery and ground are reversed over the fundamental circuit as described for incoming advance and for talking selection during a mechanical call. The reversal of battery and ground operates relay 2061 in the sender circuit to advance the sender to talking selection. The advance of the sender circuit opens the actuating circuit for relay 832 in the testing device to advance check switch 800 to position 16. In position 16 of the check switch, a circuit is established to advance the impulse switch to position 18 and talking selection is checked in the manner previously described.

Should relay 2061 in the sender fail to operate upon the reversal of battery and ground, the sender does not advance to release relay 832 and thus the testing device is arrested in its automatic progression and the alarm is sounded. Upon the completion of this test, the impulse switch 400, check switch 800, control switch 1100 are advanced to position 1 as previously described. When the check switch 800 reaches position 18, the route control switch is advanced to position 10.

Tests Nos. 9, 10 and 11 are similar in main characteristics to the tests already made and are not material to the disclosure of this invention. Therefore, it is thought unnecessary to make a detailed description of these tests.

Upon the completion of test No. 11, the numerical switch 1500 is advanced to position 1 under the control of its magnet contact and the route control switch 1650 is advanced to position 18.

Upon the completion of the tests of one sender, group switch 1820 is rotated one position to associate the testing device with a second sender to be tested. A circuit is first established to energize the winding of magnet 1820 from ground through brush 1814 and its associated contacts, brush 1804 and its associated contacts, left lower and upper contacts of cam 1712, left normal contacts of relay 1423, right inner contacts of key 1750, brush 1811 and its associated contacts, winding of magnet 1820 to grounded battery. The same circuit to ground is extended through cam 1712, winding of relay 1738, resistance 1761 to grounded battery. Relay 1738 does not operate until magnet 1820 has attracted its armature. Since a shunt is placed around the winding of relay 1738 from the same ground through the magnet contact of brush 1801, lower contact of cam 1709, resistance 1761 to grounded battery. Upon the operation of magnet 1820 the shunt is removed and relay 1738 operates. The operation of relay 1738 establishes a circuit to rotate the sequence switch, Fig. 17, from position 18 to position 1. This circuit may be braced from ground through the contact of relay 1738, left lower contact of cam 1705, winding of magnet 1700 to grounded battery. Upon the rotation of the sequence switch, relay 1738 is released and the energizing circuit for magnet 1820 is opened to associate the brush assembly of switch 1820 with the conductors of a second sender to be tested. In position 1 of the sequence switch, Fig. 17, a circuit is established to operate relay 830 to rotate the check switch 800 from position 18 to position 1. Upon the rotation of the check switch 800 out of position 18 the energizing circuit for relay 830 is opened to cause its release and arrest the rotary movement of the check switch in position 1. A circuit is now established to rotate the impulse switch 400 to position 1 as previously traced. Also a circuit is established to rotate the route control switch 1650 to position 1. The control switch 1100 is rotated to position 1, the same as previously traced and the sender is prepared to test a second sender.

Group switch 1820 advances from position to position as described, testing the first group of twenty senders. Upon the completion of the test of the twentieth sender the brushes advance to position 21 of switch 1820. In this position circuits are prepared to advance the master switches one position to associate the testing device with a second group of twenty senders that are associated with switch 1830. The sequence switch, Fig. 17, is rotated from position 1 to position 3 as described to start the first test and a circuit is established in position 3 to operate relay 1732 from grounded battery through its right winding, brush 1821 and its associated contact, brush 1812 and its associated contact, right normal contacts of relay 1737, right normal contacts of key 1433 to ground through the right upper contact of cam 1717. The operation of relay 1732 establishes a locking circuit for itself to ground through the right upper contact of cam 1703. A circuit is now established to rotate the sequence switch, Fig. 17, from position 3 to position 4 from ground through the left outer normal contact of relay 1733, left inner normal contact of relay 1737, left upper contacts of cam 1704, winding of magnet 1700 to grounded battery. The sequence switch, Fig. 17, rotates from position 4 to position 6 under the control of its magnet contact. In sequence switch position 6, energizing circuits are established through the windings of magnets 1800 and 1810 and relay 1738 as described for the rotation of these switches from their normal position to position 1. The operation of relay 1738 rotates the sequence switch, Fig. 17, as previously described, to open the energizing circuit for magnets 1800 and 1810 to advance the brush assembly from position 1 to position 2. The second group of twenty senders associated with switch 1830 is now associated through the contacts and brushes of the master switches 1800 and 1810.

The repeat key 1431, return to normal key 1432, end of cycle key 1752, control of advance key 1751, control the testing circuit in the manner described in Patent No. 1,533,477 to F. A. Stearn and J. C. McAuliffe, issued April 14, 1925. Therefore, it is thought unnecessary to describe the functions of these keys in this specification.

The actuation of key 1683 establishes an obvious circuit to energize relay 1120 in order to use the slow speed dialing interrupter 1000 during the selection in which the relay is normal. The actuation of key 1684 opens the actuating circuit for relay 1120 to release it so that the high speed interrupter may be used during a selection ordinarily employing the use of the slow speed interrupter.

*Time alarm circuits.*

The time alarm circuit shown in the left lower portion of Fig. 14 is used to allot a predetermined time interval for each one of a multi-test. Relay 1405 is operated upon actuation of start key 1750 from grounded battery through its winding, brush 1404 and its associated contact to ground through the right outer contacts of start key 1750. Relay 1405 establishes a locking circuit for itself through its left contacts, contacts of key 1406, upper contacts of cam 1107, to ground through the right outer contacts of start key 1750 or to ground at the right lower contacts of cam 1714. The operation of relay 1405 further establishes a circuit to energize magnet 1400. This circuit may be traced from grounded battery through the winding of magnet 1400 brush 1403, left outer contacts of relay 1405, conducting segment of the constantly rotating interrupter 1470 to ground. Upon the rotation of the interrupter to associate non-conducting segments with its contacts, the actuating circuit for magnet 1400 is opened to step the brush assembly from its normal terminal to terminal 1. Upon the continued rotation of interrupter 1470 the switch brush assembly is rotated from terminal to terminal advancing one step each time the contacts of the interrupter are associated with non-conducting segments.

Upon the completion of a test the control switch 1100 rotates from position 18 to position 1 as previously described and upon this rotation of the sequence switch the locking circuit for relay 1405 is opened to cause its release. The release of relay 1405 establishes a circuit to rotate the brush assembly of the timing switch to normal under the control of its self-interrupting magnet contacts. This circuit may be traced from grounded battery through the winding and contact of magnet 1400, brush 1401 and its associated multiple contacts to ground through the right inner normal contacts of relay 1405.

When the timing switch has restored to normal relay 1405 is again operated over a circuit as previously traced and is locked through the contacts of cam 1107, since sequence switch, Fig. 11, rotates to position 1 during the time that the timing switch is restoring to its normal position.

If a trouble condition is encountered in the testing of a sender, the progression of the testing device is arrested and therefore the test is not completed during the allotted time to rotate brush 1402 from normal to the contact connected to relay 1408. A circuit is thus established to operate relay 1408 and sound an alarm. When a trouble condition of this kind is encountered, the sequence switch, Fig. 11 is in one of its positions 1 to 18 and the locking circuit for relay 1405 remains established. Thus with brush 1402 associated with the contact connected to the winding of relay 1408, a circuit is established through the right inner contacts of relay 1405 to operate relay 1408. The operation of relay 1408 establishes a circuit through its contacts to actuate bell 1409 as shown.

The test man may operate key 1406 to release relay 1405. The release of relay 1405 restores the timing switch to normal. Key 1406 is, however, a non-locking key and a timing period is again counted by the switch upon the release of the key.

The locking ground for relay 1405 is carried to cam 1714 so that the timing switch will continue to rotate after the start key is restored to normal and until the sequence switch, Fig. 11, rotates from position 18 to position 1.

What is claimed is:

1. A testing arrangement for testing register senders of an automatic telephone exchange comprising means for transmitting interruptions at different speeds for setting said registers, and means responsive to the operation of the sender in accordance with the setting of its registers for testing the accuracy with which said registers have functioned in response to said interruptions.

2. A testing arrangement for testing register senders of an automatic telephone exchange comprising means to simulate differently adjusted subscriber's dials by transmitting interruptions at different speeds for setting said registers, and means responsive to the operation of the sender in accordance with the setting of its registers for testing the accuracy with which said registers have functioned in response to said interruptions.

3. A testing arrangement for testing register senders of an automatic telephone exchange comprising means for transmitting interruptions at different speeds for setting said registers to simulate the control of automatic switches, and means responsive to the operation of the sender in accordance with the setting of its registers for testing the ability of said register sender for controlling automatic switches in response to said interruptions.

4. A testing arrangement for testing register senders of an automatic telephone exchange comprising automatically operable means for transmitting interruptions at different speeds, automatically positioned switches to control the number of such interruptions to control the setting of said registers, and means responsive to the operation of the sender in accordance with the setting of its registers for testing the accuracy with which said registers have functioned in response to said interruptions.

5. A testing arrangement for testing senders of an automatic telephone exchange comprising means for transmitting interruptions at different speeds for setting said registers, means responsive to the operation of the sender in accordance with the setting of its registers for testing the accuracy with which said registers have functioned in response to said interruptions, and means for indicating the manner in which any register has inaccurately functioned.

6. In a testing system for testing register senders of an automatic telephone exchange, automatic means to progressively select a plurality of such senders for test, means for transmitting interruptions at different speeds for setting the registers of a selected sender, and means responsive to the operation of said sender in accordance with the setting of its registers for testing the accuracy with which said registers have functioned in response to said interruptions.

7. In a testing system for testing register senders of an automatic telephone exchange, automatic means to progressively select a plurality of such senders for test, means for transmitting interruptions at different speeds for setting the registers of a selected sender, automatically progressive means responsive to the operation of said sender for testing the accuracy with which said registers have functioned in response to said interruptions, and means to arrest the automatic progression of said test when said registers have functioned inaccurately.

8. A testing arrangement for testing register senders of an automatic telephone exchange comprising means for transmitting interruptions at different speeds for setting said registers, and automatically progressive means responsive to the operation of the sender to check the accuracy with which said registers function to simulate the control of automatic switches for making a service connection in response to said interruptions.

9. A testing arrangement for testing register senders of an automatic telephone exchange comprising means for transmitting interruptions at different speeds for setting said registers, automatically progressive means responsive to the operation of the sender to check the accuracy with which said registers function to simulate the control of automatic switches for making a service connection in response to said interruptions, and means to operate signals to indicate the check of each register during said automatic progression.

10. A testing arrangement for testing register senders of an automatic telephone exchange comprising means for transmitting interruptions at different speeds for setting said registers, automatically progressive means responsive to the operation of the sender to check the accuracy with which said registers function to simulate the control of automatic switches for making a service connection in response to said interrupters, and means to operate signals to indicate an inaccurate functioning sender and the manner of its inaccuracy.

11. In a testing system for testing register senders of an automatic telephone exchange, a testing device having means to control said registers by transmitting interruptions of different speeds to the apparatus of said senders and means to check the respective operation of each register in accordance with the interruptions transmitted.

12. In a testing system for testing register senders of an automatic telephone switch, a testing device having means to control said registers by transmitting interruptions of different speeds to the apparatus of said senders and means to check the respective operation of each register in accordance with the interruptions transmitted, a plurality of group switches each associated with a group of senders, master switches, means to operate said master switches to progressively select said group switches, and means to operate a selected group switch to successively associate each sender of said group with said testing device.

In witness whereof, I hereunto subscribe my name this 6th day of December A. D., 1923.

FRANK N. REEVES.